United States Patent
Fairhall

(10) Patent No.: US 7,293,528 B2
(45) Date of Patent: Nov. 13, 2007

(54) PET LITTER CLEANING SYSTEM AND METHOD

(76) Inventor: Andrew Fairhall, 7102 N. Perugia Way, Tucson, AZ (US) 85741

( * ) Notice: Subject to any disclaimer, the term of this patent is extended or adjusted under 35 U.S.C. 154(b) by 0 days.

(21) Appl. No.: 11/317,935

(22) Filed: Dec. 23, 2005

(65) Prior Publication Data
US 2007/0144448 A1 Jun. 28, 2007

(51) Int. Cl.
*A01K 29/00* (2006.01)
(52) U.S. Cl. ............... 119/166; 119/165; 119/168; 209/374; 209/373
(58) Field of Classification Search ........... 119/165, 119/166, 168, 161, 169; 209/374, 373, 233, 209/417; D30/161; 294/1.3
See application file for complete search history.

(56) References Cited

U.S. PATENT DOCUMENTS

| | | | |
|---|---|---|---|
| 4,190,525 A * | 2/1980 | Menzel ............... 209/235 |
| 4,854,267 A | 8/1989 | Morrow | |
| 5,178,099 A * | 1/1993 | Lapps et al. ......... 119/166 |
| 5,259,340 A | 11/1993 | Arbogast | |
| 5,272,999 A * | 12/1993 | Nussle ............... 119/166 |
| 5,507,252 A * | 4/1996 | Ebert ............... 119/166 |
| 5,544,620 A | 8/1996 | Sarkissian | |
| 5,579,721 A | 12/1996 | O'Toole | |
| 5,601,052 A | 2/1997 | Rood et al. | |
| 5,673,648 A | 10/1997 | Ayle | |
| 5,678,508 A | 10/1997 | Butzen | |
| 5,749,318 A | 5/1998 | Barbot et al. | |
| 5,823,137 A | 10/1998 | Rood et al. | |
| 5,911,194 A * | 6/1999 | Pierson, Jr. .......... 119/166 |
| 6,095,088 A | 8/2000 | Savicki | |
| 6,286,457 B1 | 9/2001 | Sugahara | |
| 6,295,949 B1 | 10/2001 | Willis | |
| 6,523,495 B1 * | 2/2003 | Rydman ............. 119/167 |

* cited by examiner

*Primary Examiner*—Andrea M. Valenti
(74) *Attorney, Agent, or Firm*—Altimatia, LLC; David M. Gange

(57) ABSTRACT

A pet litter containment and cleaning system and methods of using a pet litter containment and cleaning system are described. The pet litter system comprises a pan module and removably attached processor module. Soiled pet litter is conveniently processed by rotating a system of the invention, screening and separating soiled litter from clean litter. Pet waste and soiled litter are collected in bags which may be discarded when full. Systems of the invention may be used with both absorbent and nonabsorbent litters. Systems of the invention minimize human contact with soiled pet litter and pet waste and simplify the care of domestic pets.

16 Claims, 20 Drawing Sheets

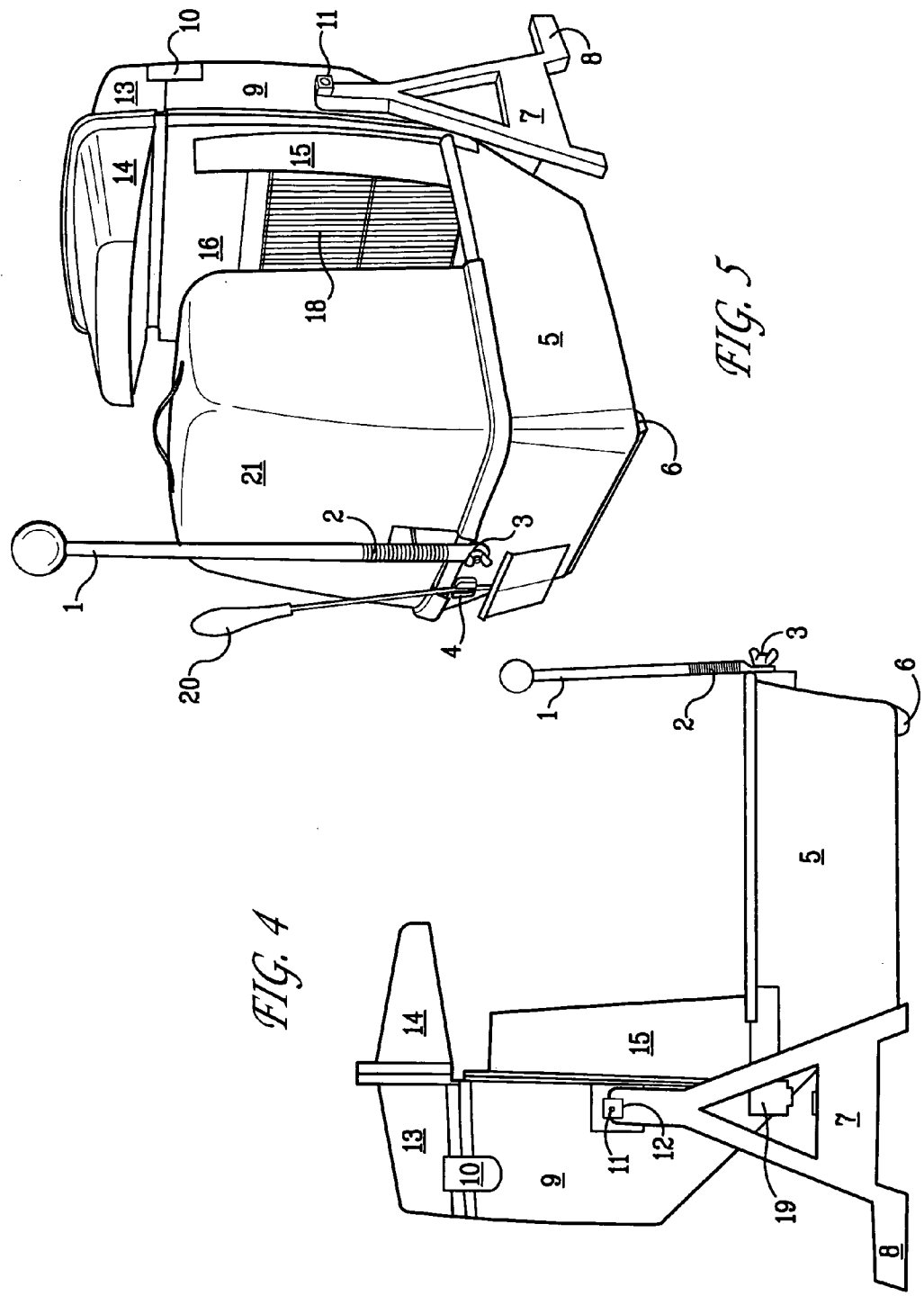

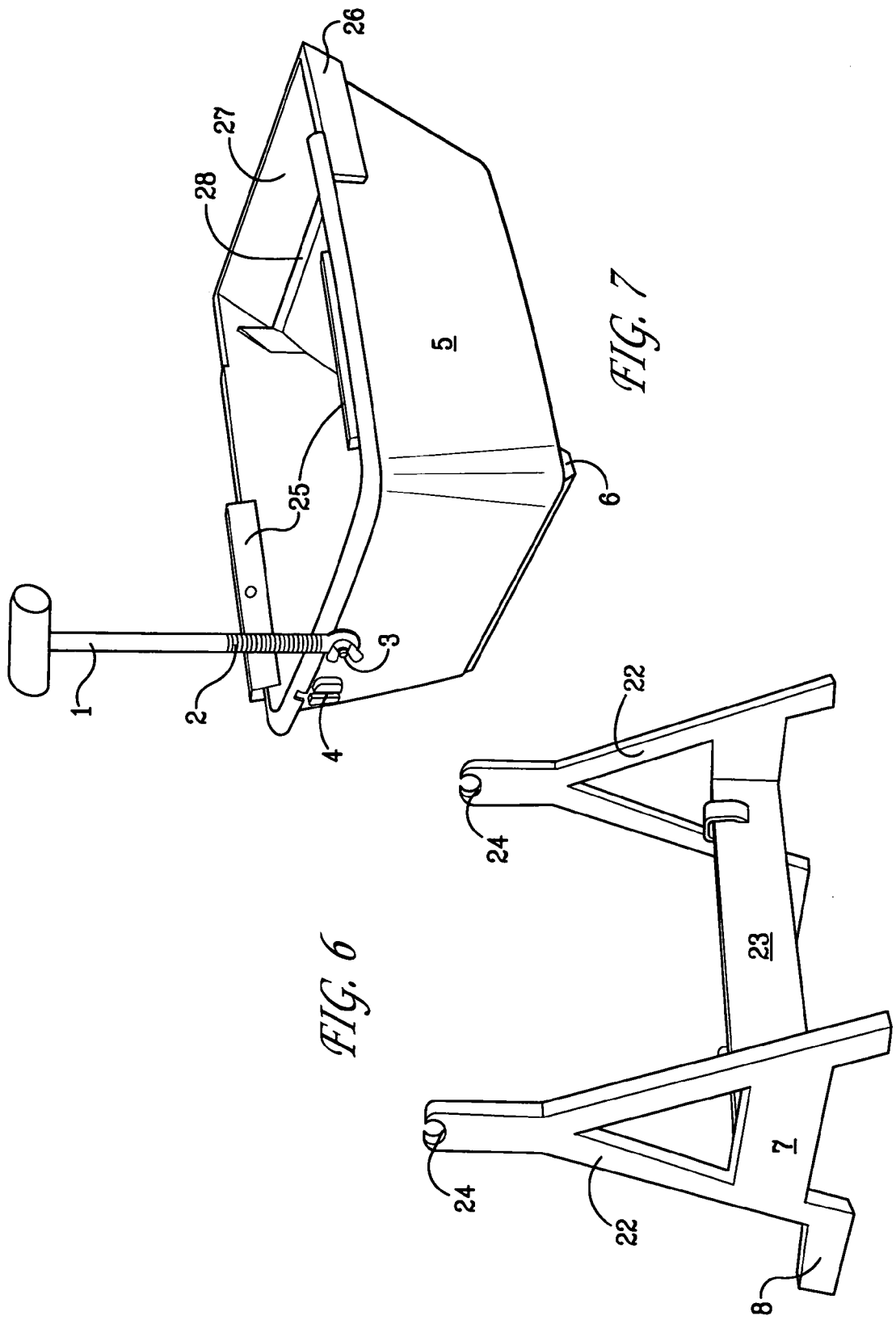

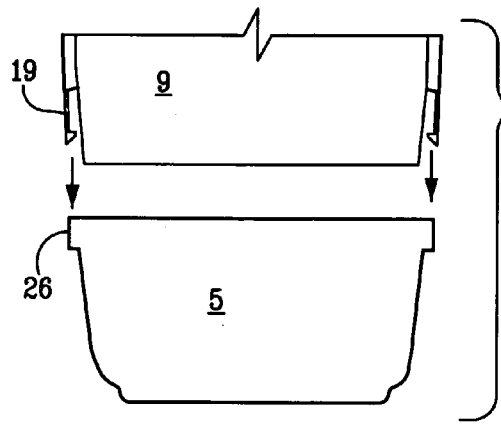
FIG. 9A
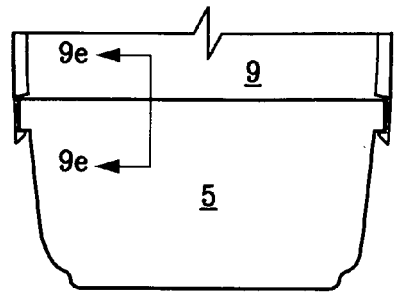
FIG. 9B
FIG. 9C
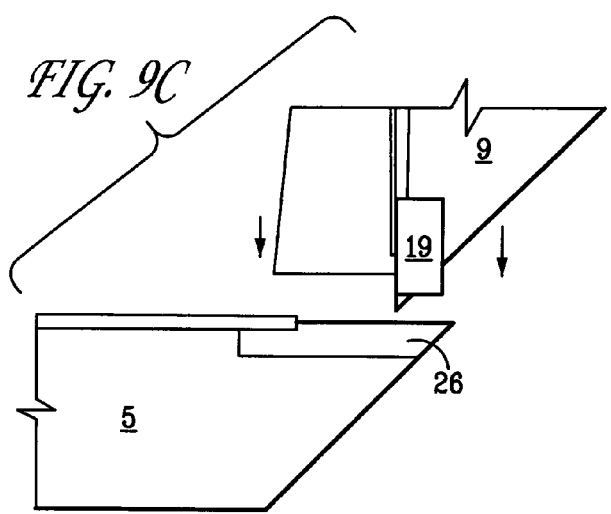
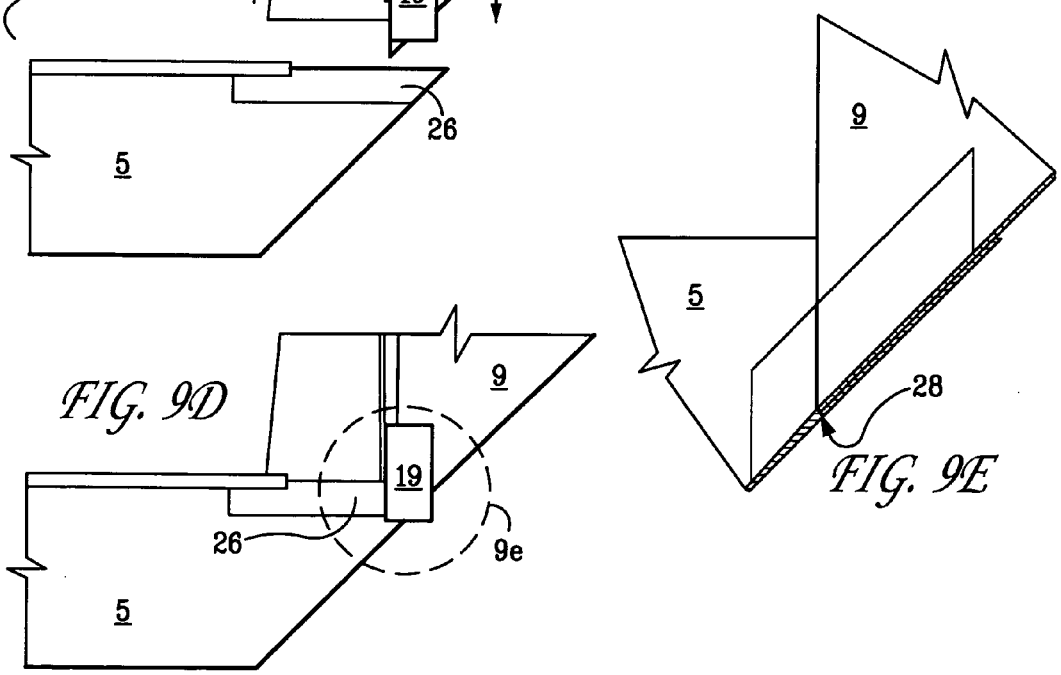
FIG. 9D
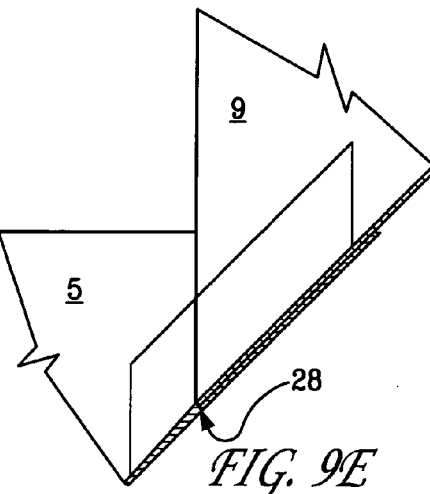
FIG. 9E

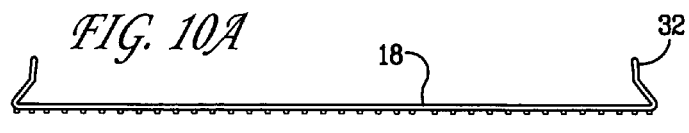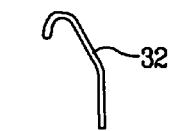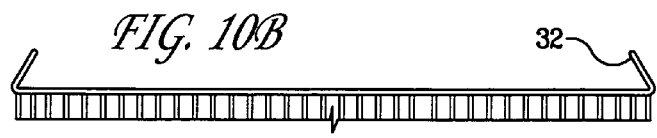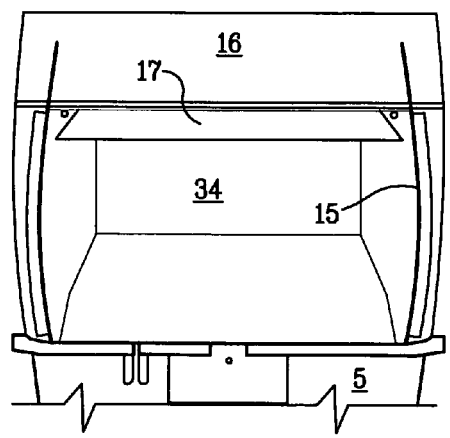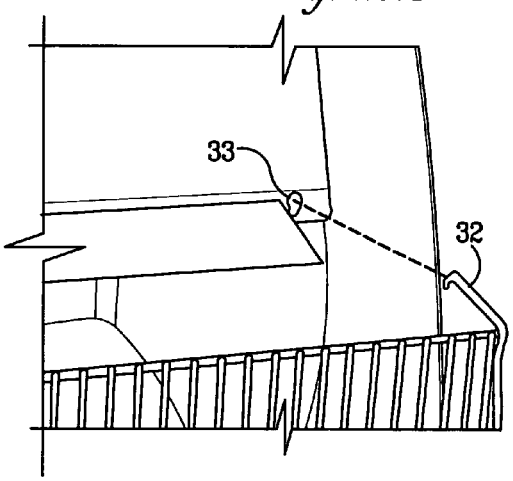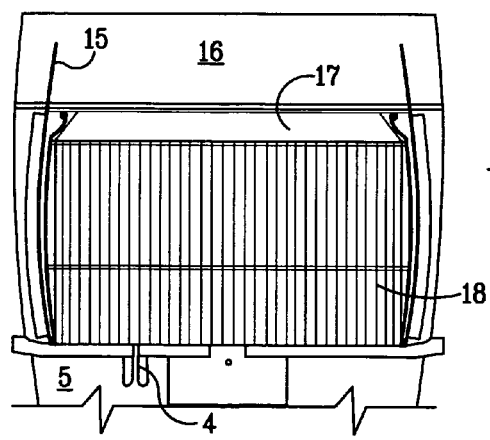

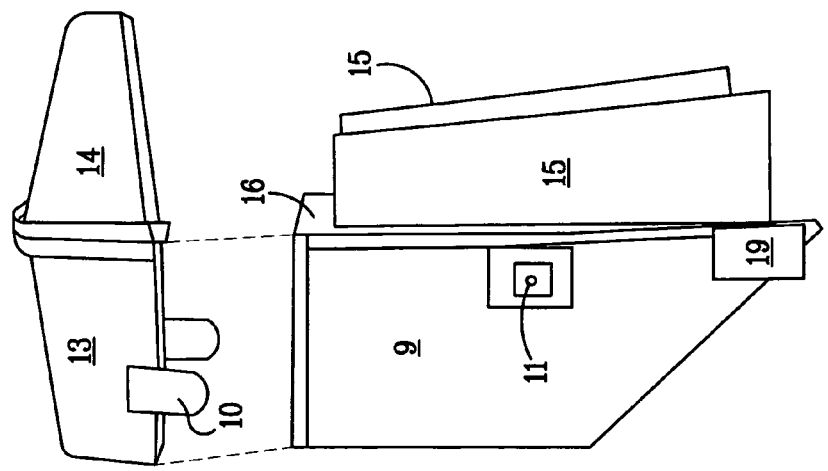
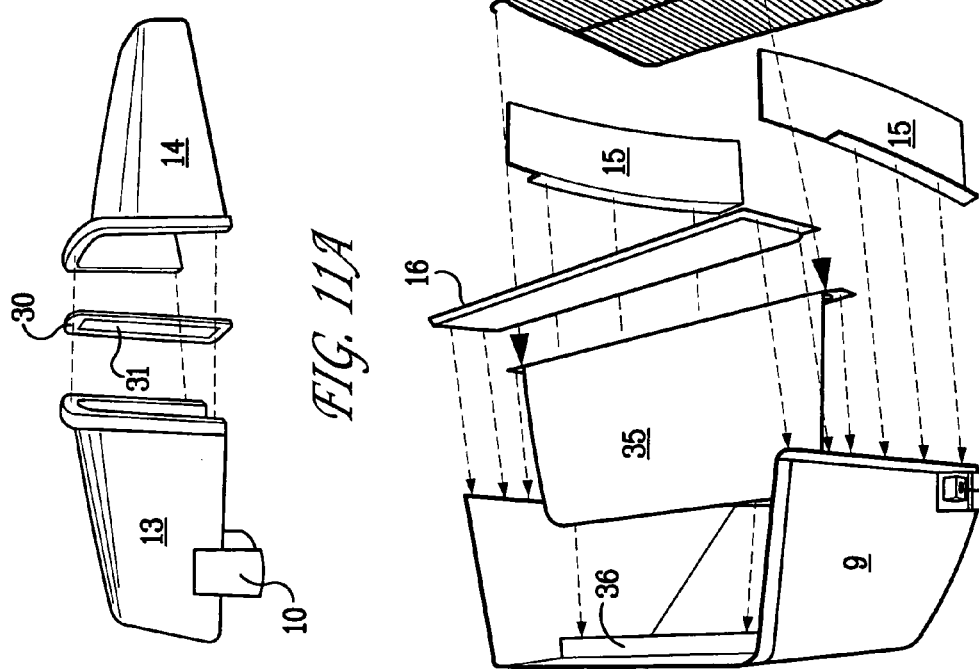
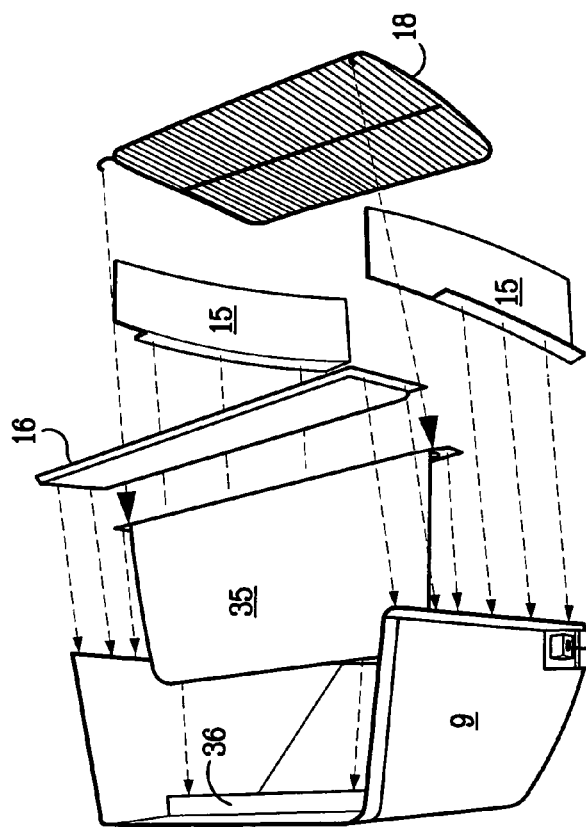
FIG. 11A
FIG. 11B
FIG. 11C

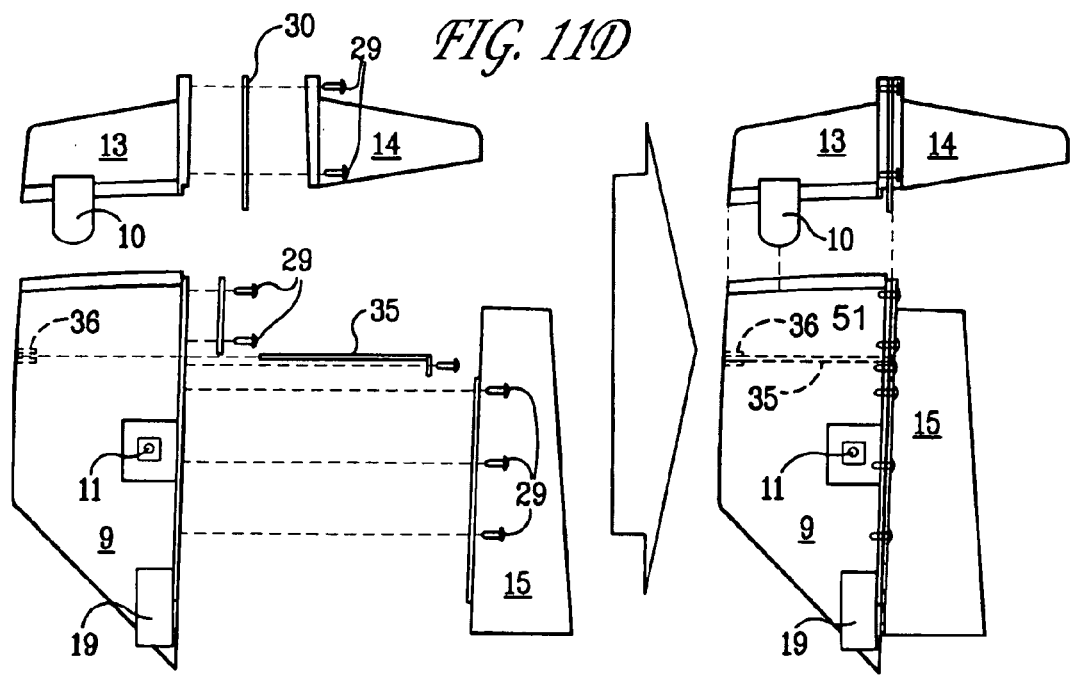
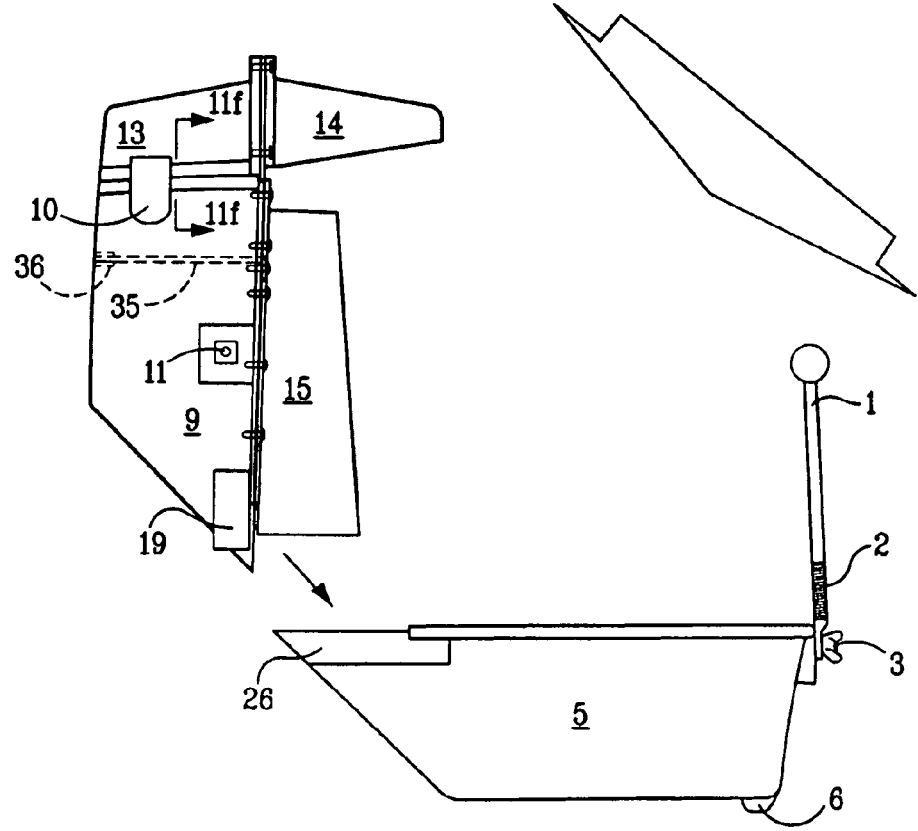
FIG. 11D

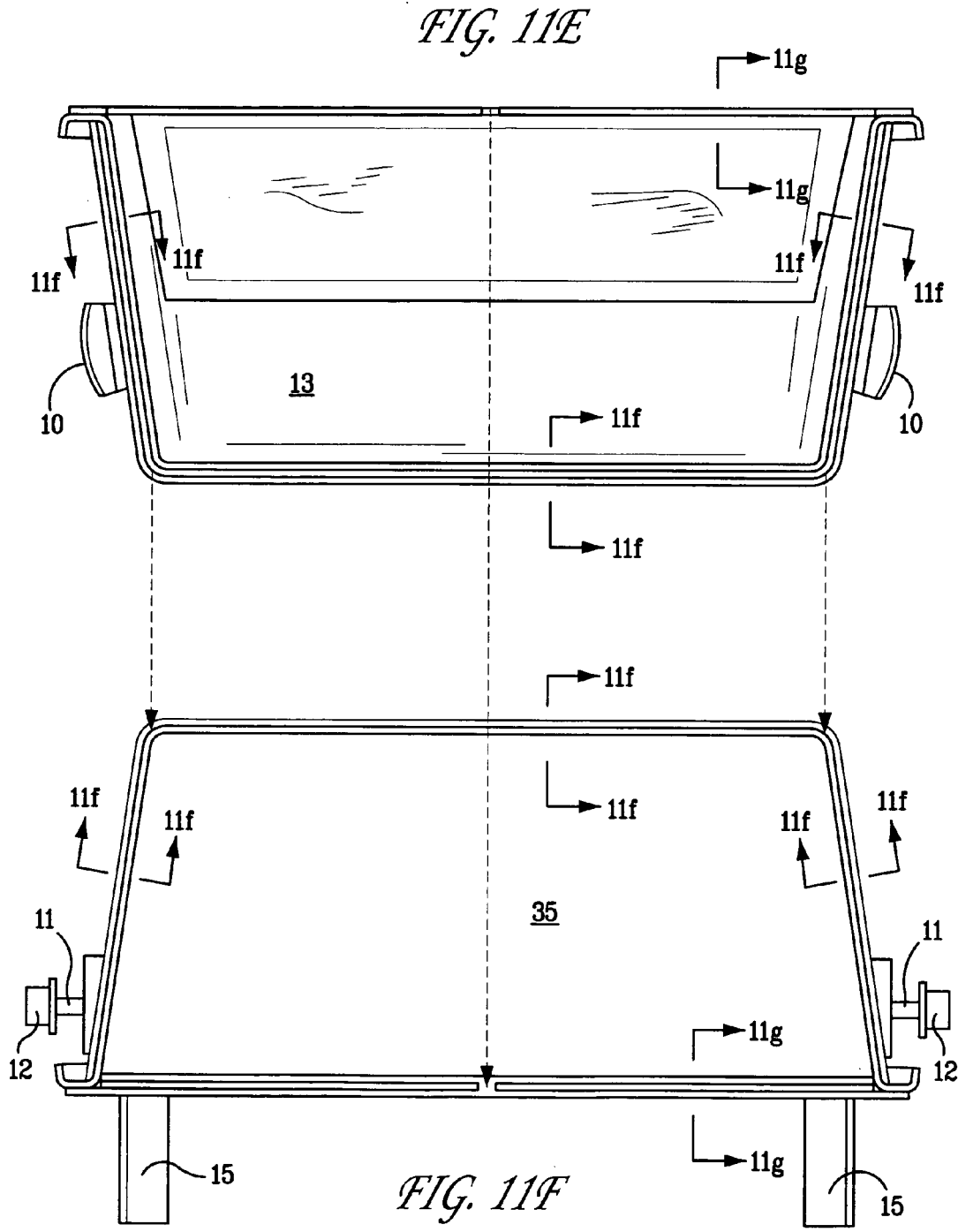

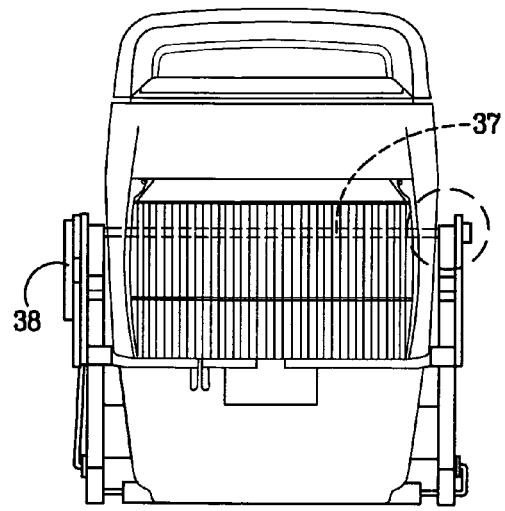
FIG. 14A
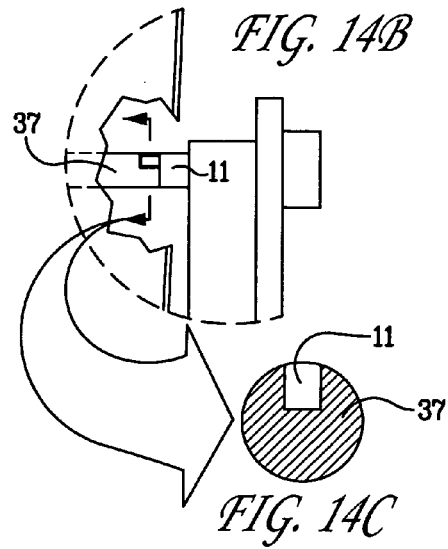
FIG. 14B
FIG. 14C
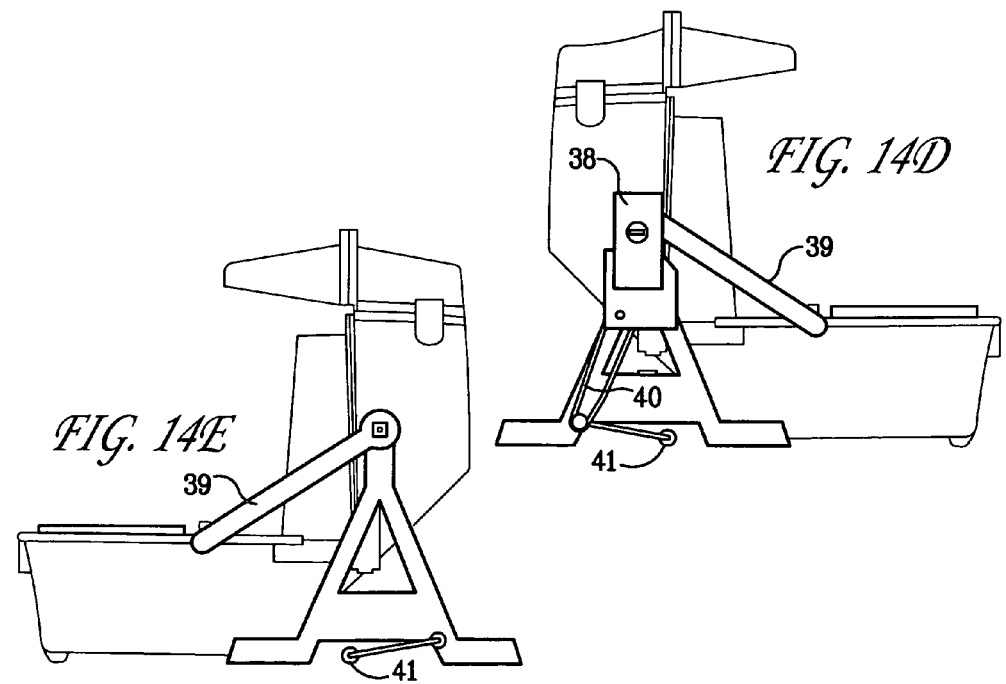
FIG. 14D
FIG. 14E

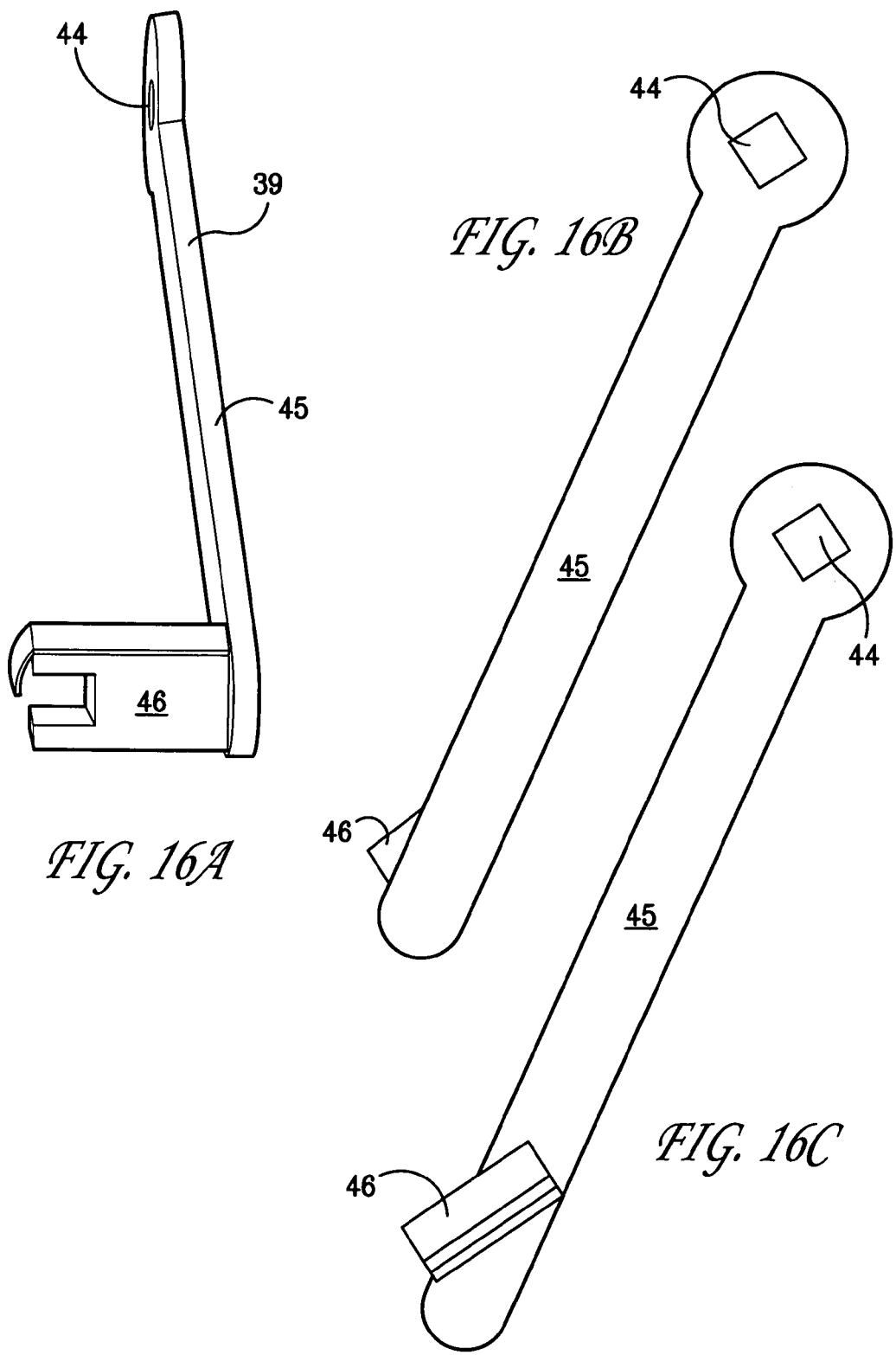

PET LITTER CLEANING SYSTEM AND METHOD

FIELD

The invention relates to pet litter devices and methods of using pet litter devices.

BACKGROUND

Domestic pets, particularly pets that are kept indoors, require a place to perform their bodily functions and a container for their waste. Typically the place and container are combined in the form of a liner box. Litter, either absorbent or nonabsorbent, is contained within the liner box. After an animal has deposited its' waste in the litter the pet owner is confronted with the unpleasant task of cleaning the litter box. Since soiled litter contained in a litter box will quickly develop a foul odor, litter boxes and litter must be frequently cleaned in order to keep them agreeable to both pet and owner. To maintain a desired level of cleanliness a pet owner is required to keep watch on the litter box and perform the cleaning chore on a regular basis.

While liner box cleaning is a time-consuming nuisance that must be performed, pet owners prefer to minimize their contact with soiled litter and associated pet waste. Litter boxes may be cleaned by discarding all litter in a litter box after a pet has used the litter. However, discarding litter is wasteful and expensive therefore many pet owners prefer to separate soiled litter from clean litter, and then reuse the cleaned litter to save money and minimize the waste of litter. To address litter box cleaning issues a variety of devices have been developed. Hand held scoops as well as more elaborate liner box cleaning devices have been described. For example, U.S. Pat. No. 4,854,267 issued to Morrow describes a liner box with a screening and draining mechanism. However the device is designed to work with nonabsorbent litter, not with absorbent litter. In addition the device has a fairly complicated mechanism which may be prone to breakdown. U.S. Pat. No. 5,259,340 issued to Arbogast describes a semiautomatic litter box operated by a crank mechanism. The device describe in the '340 patent is designed to work with absorbent litters, not nonabsorbent litters, and the crank mechanism has the effect of pushing all of the cleaned litter to one side of the container when used. In addition, there is no convenient method of cleaning the screen used to sift the litter, should the screen itself become soiled with waste. Another device is described in U.S. Pat. No. 5,544,620 issued to Sarkissian. As with the previous device the '620 device is designed to work with absorbent litter. The litter box described in U.S. Pat. No. 5,678,508 issued to Butzen is designed to work with absorbent litter, cannot be operated automatically, and operating the device requires bending and physical effort on the part of the pet owner. Another device is described in U.S. Pat. No. 5,749, 318 issued to Barbot et al.. The '318 device is designed to work with absorbent litter, is mechanically complex, and uses a cleaning screen which may be burdensome to clean when soiled with pet waste. The drum-type litter box described in U.S. Pat. No. 6,286,457 issued to Sugahara is designed to work with absorbent, clumping litters. In addition, cleaning the interior of the drum may be difficult. Other references of interest include U.S. Pat. No. 4,120,264 issued to Carter; U.S. Pat. No. 4,522,150 issued to Gershman; U.S. Pat. No. 4,846,104 issued to Pierson; U.S. Pat. No. 5,107, 797 issued to Laroche; U.S. Pat. No. 5,477,812 issued to Waters; U.S. Pat. No. 5,509,379 issued to Hoeschen and U.S. Pat. No. 5,752,465 issued to Page. The references cited above and all other references cited within this application are hereby incorporated herein by reference.

There remains a need for a litter box devices and methods of using litter box devices that do not require the use of specific consumables, such as absorbent or nonabsorbent litter, which minimize physical effort on the part of the user, which are mechanically simple and therefore reliable, which minimize odors, which minimize or eliminate contact with soiled litter, and which may optionally be operated automatically.

SUMMARY

Embodiments of the invention are pet liner containment and cleaning systems and methods of using such systems. Pet litter containment and cleaning systems of the invention comprise a pan module adapted to hold pet litter comprising a front portion, a rear portion, sides, and a bottom. Systems of the invention further comprise a processor module for cleaning pet litter attached to the rear of a pan module with a top portion of the processor module comprising a waste containment compartment. A litter screen is attached to a front portion of the processor module. At least one axle is fixedly attached to the sides of the processor module and projects perpendicularly outward from the side exteriors about one to six inches. The axle defines an axis of rotation for the system. A processor cap is attached to the top portion of the processor module covering the waste containment compartment. The processor cap projects past the front portion of the processor module forming a waste guide, which guides pet waste into the waste containment compartment during litter cleaning. The pan module of a system of the invention rests upon a horizontal surface, such as a floor, and the axle(s) of the processor module rest upon a support comprising axle bearing areas for supporting the axle(s).

Systems of the invention may be used by providing a pet access to a system of the invention and allowing a pet to use litter contained within the system. Soiled litter is cleaned by rotating the system about the axis of rotation defined by the axle(s). As a system of the invention is rotated litter is allowed to flow from the pan module into the processor module and through the litter screen. Soiled litter and pet waste are trapped by the litter screen and are allowed to flow into the processor cap. As a system of the invention is rotated back to the starting position the soiled litter and pet waste flow into the waste containment compartment and the cleaned litter flows back into the pan module. The system is again ready for use by a domestic pet. The rear of a system of the invention may optionally be lifted a few inches to allow any litter remaining in the processor module to flow into the pan module and the litter may be leveled in the pan module.

Systems of the invention minimize user contact with soiled litter and minimize odors associated with pet waste and pet litter. Systems of the invention may be used with all types of litter and may be operated manually or may optionally be operated automatically. Embodiments of the invention require no bending or lifting to operate, are easy to clean and compact. Systems of the invention have a simple design which insures mechanical reliability.

DESCRIPTION OF THE DRAWINGS

FIG. 4 shows a side view of a system of the invention

FIG. 5 shows a perspective view of a system of the invention with optional tool (20), and optional cover (21).

FIG. 6 shows a perspective view of a support.

FIG. 7 shows a perspective view a pan module of a system of the invention.

FIGS. 9A-E show details of the connection between the processor and pan modules of a system of the invention.

FIGS. 10A-F show details of the attachment of a litter screen to a processor module of a system of the invention.

FIG. 14A shows a front view of a motorized system of the invention.

FIG. 14B shows a detail illustrating a possible connection between an axle shaft and an axle.

FIG. 14C shows a detail illustrating a possible connection between an axle shaft and an axle.

FIG. 14D shows a left side view of a motorized system of the invention.

FIG. 14E shows a right side view of a motorized system of the invention.

FIG. 16A shows a perspective view of an arm portion of a motorized system of the invention.

FIG. 16B shows a right side view of an arm portion of a motorized system of the invention.

FIG. 16C shows a left side view of an arm portion of a motorized system of the invention.

DETAILED DESCRIPTION

As used herein a 'domestic pet' or a 'pet' is a pet such as a cat, a ferret, a skunk, a rabbit, or any other small mammal kept as a pet.

As used herein 'litter' refers to sand, or absorbent clay particles, wheat particles, paper particles, corn particles or other absorbent particles sold under such brand names as PEARL FRESH®, SWHEAT Scoop®, ADVANCED SCOOP®, WORLD'S BEST®, EVER CLEAN®, FRESH STEP®, YESTERDAY'S NEWS®, and EXQUISICAT®. 'Litter' also refers to non-absorbent plastic and mineral litters. Non-absorbent litters may be used when the collection of urine samples is desired.

As used herein 'attached' refers to elements which are connected to one another. Elements may be attached to one another by nut and bolt connections, screw connections, glueing, by hook and loop fasteners (VELCRO®), cotter pins, nailing, melting together, fusing, welding, or by mechanical contact. 'Fixedly attached' refers to elements which are permanently attached to one another. 'Removably attached' refers to elements which may be separated from one another if necessary.

As used herein 'connected' and 'operably connected' refer to elements which are joined so as to operate in a functional manner. 'Connected' and 'operably connected' may refer to elements which are mechanically connected or which are electrically connected or both.

Details of embodiments of the invention will be discussed with reference to the accompanying figures.

Figure 1:
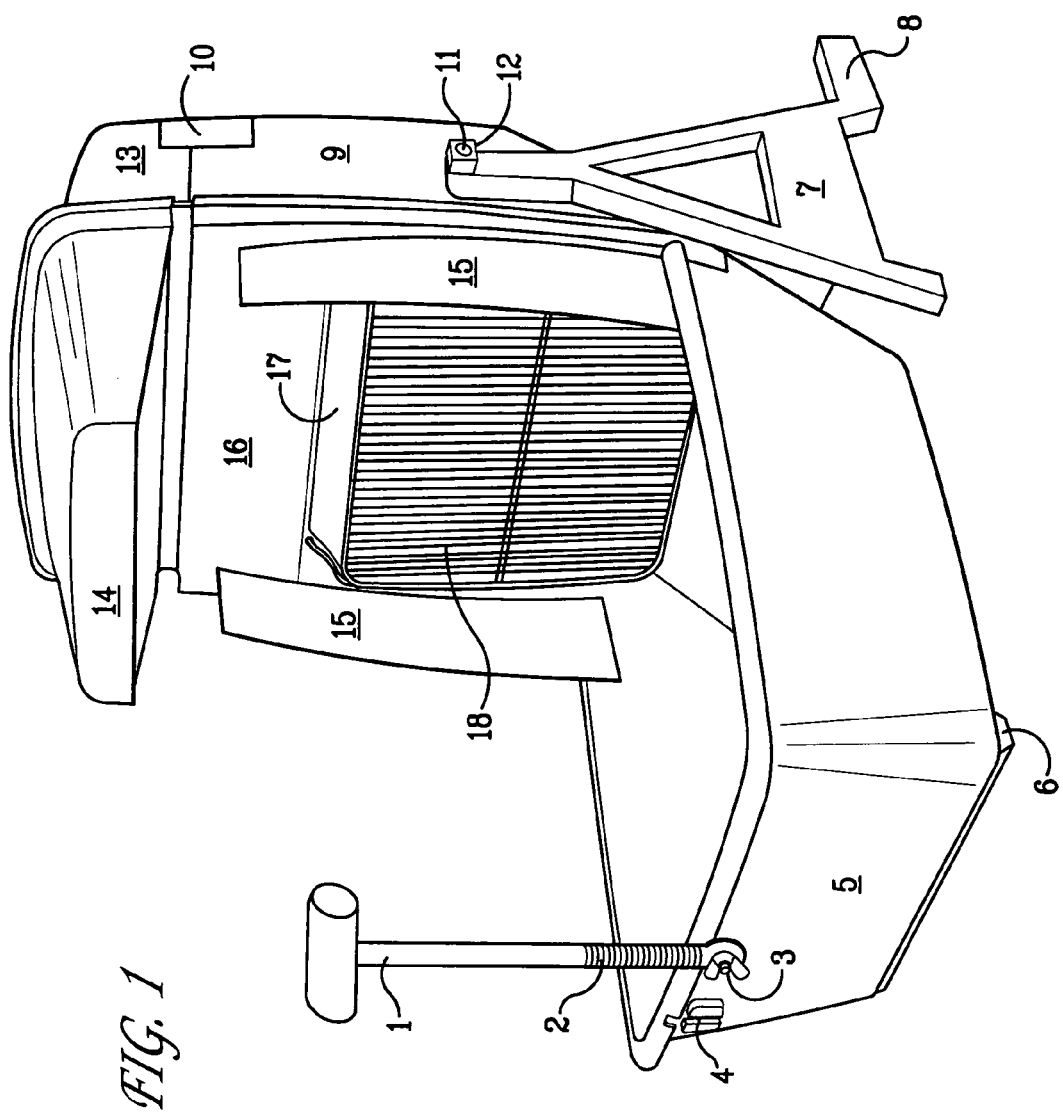
FIG. 1 shows a perspective view of a pet litter containment and cleaning system of the invention.

A perspective view of an embodiment of a system of the invention is shown in FIG. 1. A stick, comprised of a stick handle (1) attached to a stick handle spring (2), is attached to the pan module (5) front portion at the attachment point (3). The stick may be attached by any convenient means, such as a bolt and wing nut, or other bolt and nut combination, or cotter pin, or screw, or glue, or other fastening means. Alternatively the stick may comprise a rigid stick hingedly attached to the pan module (5). The pan module (5) is adapted to hold pet litter for use by a pet when the system is in use, and may optionally have a skid bar (6) placed on the underside of the front portion of the pan module. Skid bar (6) is made of a non-skid material and helps to keep the system in place during litter processing. Adjacent to the attached stick is a holder (4) which may be used to hold a clump cutter or other tool or implement, such as a litter scoop or a brush. Attached to the pan module (5) is a processor module (9). The processor module (9) is used for cleaning soiled litter and collecting pet waste. The bottom portion of the processor module (9) is attached to the rear portion of the pan module (5). The processor module further comprises a top portion, sides, a front portion, a litter screen (18), a waste containment compartment (16) and a processor cap optionally comprised of a processor cap back portion (13) and a processor cap front portion (14). The processor may also comprise side shields (15) fastened to the front sides of the processor module and aligned approximately parallel with the sides. The optional side shields (15) may be fastened to the sides of the processor module, or the side shields and processor may form a single contiguous structure. A litter retention shield (17) may be attached to the waste containment compartment bottom (FIG. 11B, 35) and extend to about the top of the litter screen. The litter retention shield (17) may be contiguous with the waste containment compartment floor (35), or it may be a separate element attached to the waste containment compartment floor (35). The processor cap is attached to the processor module (9) by processor cap fasteners (10). Processor cap fasteners may be snap fasteners, hook and loop fasteners (such as VELCRO®), or other fasteners that may be used to removably attach the processor cap to the processor module. The processor module may optionally comprise a handle on the exterior rear (not shown). The optional handle may be attached to the processor rear, or the processor rear may be molded to form a handle that is integral to the processor rear.

The sides of the processor module may be fixedly attached to at least one axle (11) which rests upon the support (7). The axle defines an axis of rotation for the system and it projects perpendicularly outward from the sides of the processor module about one to six inches. The axle (11) may be a single axle that passes through the processor module, or the axle may comprise two separate axles (11), where the axles are fixedly attached to opposite exterior sides of the processor module and aligned collinearly to define an axis of rotation. In an alternative embodiment the axle (11) passes through the processor sides, but is not fixedly attached to the sides, instead the processor unit may rotate about the axle (11). In the alternative embodiment, guides may be attached to the axle to minimize the sideways movement of the system on the axle. In the alternative embodiment bushings may be provided in the processor sides to allow smooth rotation of the system of the invention The support (7) comprises axle bearing areas and may further comprise rear leg extensions (8). Axle ends (12) are polygonal to facilitate connecting the axle(s) to an optional motor. Axle ends may form a narrow bar, or be triangular, rectangular, pentagonal, hexagonal, or other polygonal shape. The pan module (5), processor module (9), processor cap, and support (7) may be comprised of plastic, such as polyethylene, or polypropylene, or other plastics, or metal, or coated metal such as epoxy coated metal, other suitable material or a combination of materials. Suitable materials comprise materials which are waterproof and corrosion resistant.

Figure 2:
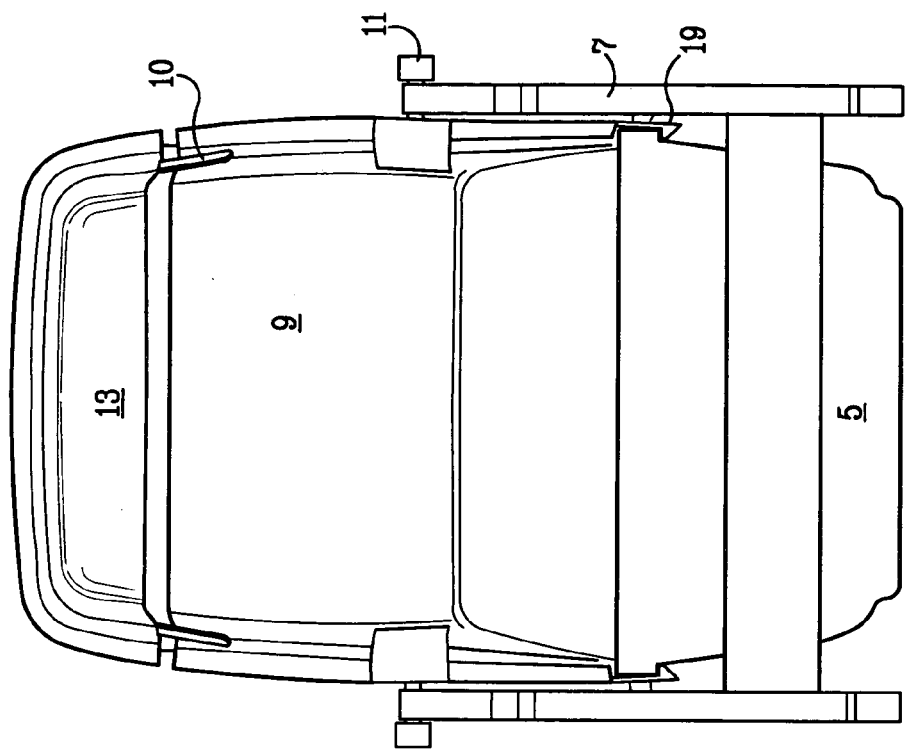
FIG. 2 shows a front view of a system of the invention.
Figure 11G:
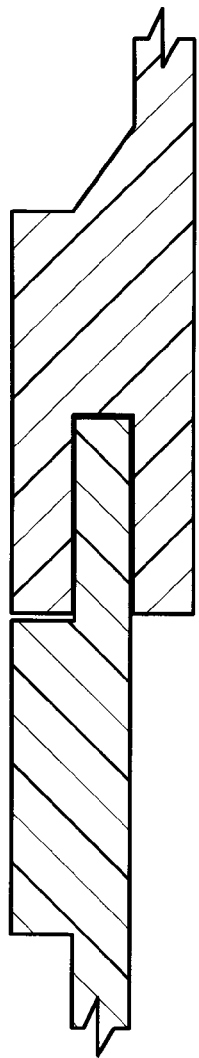
FIGS. 11A-G show details of a processor cap of a system of the invention.

A front view of an embodiment of a system of the invention is shown in FIG. 2. A stick, comprised of a stick handle (1) attached to a stick handle spring (2), is attached to the pan module (5) at attachment position (3). Adjacent to the attached stick handle is a holder (4) which may be used to hold a clump clutter or other tool or implement, such as a litter scoop or a brush. Attached to the rear of the pan module is a processor module (9). The processor module further comprises a litter screen (18), optional litter retention shield (17), optional side shields (15), waste containment compartment (16), and a processor cap optionally comprised of a processor cap back portion and a processor cap front portion (14). Extending perpendicularly outward from opposite exterior sides of the processor module is at least one axle (11), which rests upon the support (7). Details of the tongue and groove connection between the processor cap and the processor module are shown in FIG. 11G.

Figure 3:
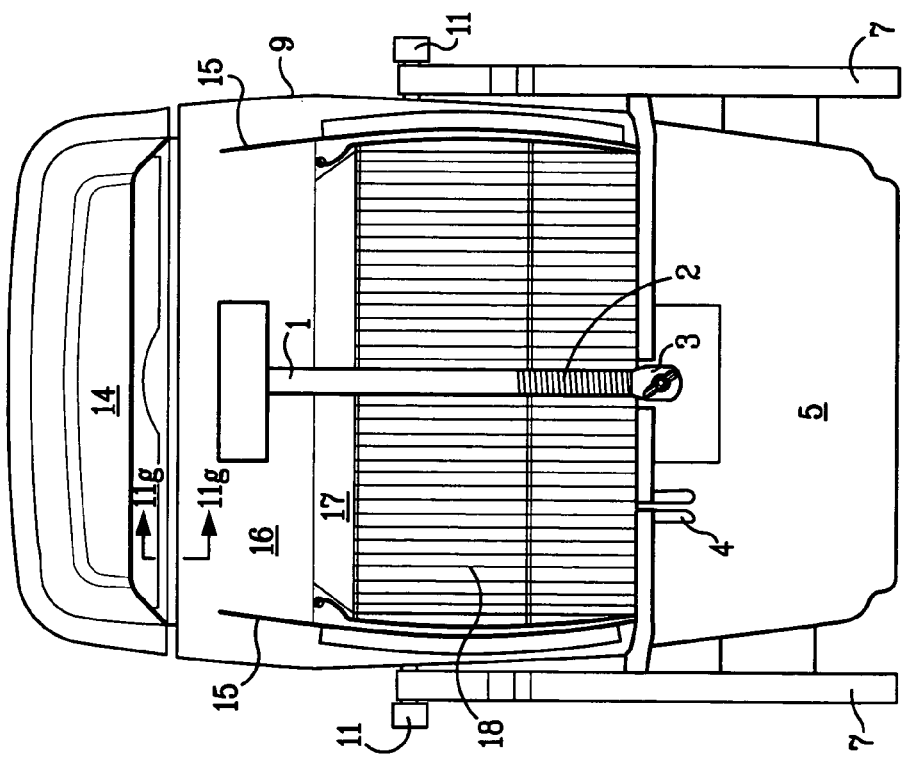
FIG. 3 shows a back view of a system of the invention.

A back view of an embodiment of a system of the invention is shown in FIG. 3. A pan module (5) is attached to a processor module (9). Also attached to the processor module is a processor cap, optionally comprising a processor cap back portion (13) and a processor cap front portion. The processor cap is attached to the processor module (9) by processor cap fasteners (10). Extending perpendicularly outward from opposite exterior sides of the processor module is at least one axle (11), which rests upon the support (7). The processor module (9) is attached to the pan module (5) by processor fasteners (19). Processor cap fasteners and processor fasteners may be snap fasteners, hook and loop fasteners (such as VELCRO®), or other fasteners that may be used to removably attach the processor cap to the processor module and to removably attach the processor module to the pan module.

A side view of an embodiment of a system of the invention is shown in FIG. 4. A stick, comprised of a stick handle (1) attached to a stick handle spring (2), is attached to the pan module (5) at the attachment position (3). Attached to the pan module (5) is a processor module (9). The processor module (9) further comprises optional side shields (15), and a processor cap, optionally comprised of a processor cap rear portion (13) and processor cap front portion (14). Extending perpendicularly outward from opposite exterior sides of the processor module is at least one axle (11), with axle ends (12). The processor cap rear portion (13) may be attached to the processor module (9) by processor cap fasteners (10). The processor module (9) may be attached to the pan module (10) by processor fasteners (19). The axle(s) (11) of the processor module (9) rest upon the support (7). The rear legs of the support may further comprise leg extensions (8), to provide stability to the system during litter processing.

A perspective view of an embodiment of a system of the invention is shown in FIG. 5. Attached to the pan module (5) is an optional cover (21). A tool (20) or implement (20) is shown in the tool or implement holder (4).

A perspective view of an embodiment of a support (7) is shown in FIG. 6. The support is comprised of support legs (22), optional support rear leg extensions (8), support cross bar (23), and axle bearing areas (24). The support may be constructed of one or more pieces. If the support is comprised of multiple components, the components may be fastened to one another by any fastening means such as glue, nails, screws, snap fasteners, friction fasteners, nut and bolt fasteners, hook and loop fasteners (VELCRO®), or other fastening means.

A perspective view of a pan module of the invention is shown in FIG. 7. The pan module is adapted to hold pet litter for use by a pet. A stick, comprised of a stick handle (1) attached to a stick handle spring (2), is attached to the pan module (5) at the attachment position (3). The stick may be attached by any convenient means, such as a bolt and wing nut, or other bolt and nut combination, or cotter pin, or glue, or screw, or screw in connection, other fastening means. Adjacent to the attached stick is a holder (4) which may be used to hold a clump cutter, or other tool or implement, such as a litter scoop or a brush. Optionally attached to the front underside of the pan module is skid bar (6). Skid bar (6) may be made of a non-skid material and may help to keep the system in place during litter processing. Attached to the upper rear edges of the sides of the pan module (5) are the pan halves (26) of the processor fasteners. Attached to the top edges of the sides of the pan module are optional detection means (25). The detection means may be attached to any convenient location on the system. The detection means (25) may be used to detect the presence of a pet within the pan module and may be located at any suitable position on the system. The rear (27) of the pan module (7) is forms an angle with the bottom of the pan module. The angle between the pan bottom and the pan rear (27) is preferably between about 20 degrees and about 70 degrees. Most preferably the angle between the pan bottom and the pan rear (27) is about 45 degrees. The pan rear further comprises a ridge (28) which forms a seal when the processor module is attached to the pan module.

Figure 8:
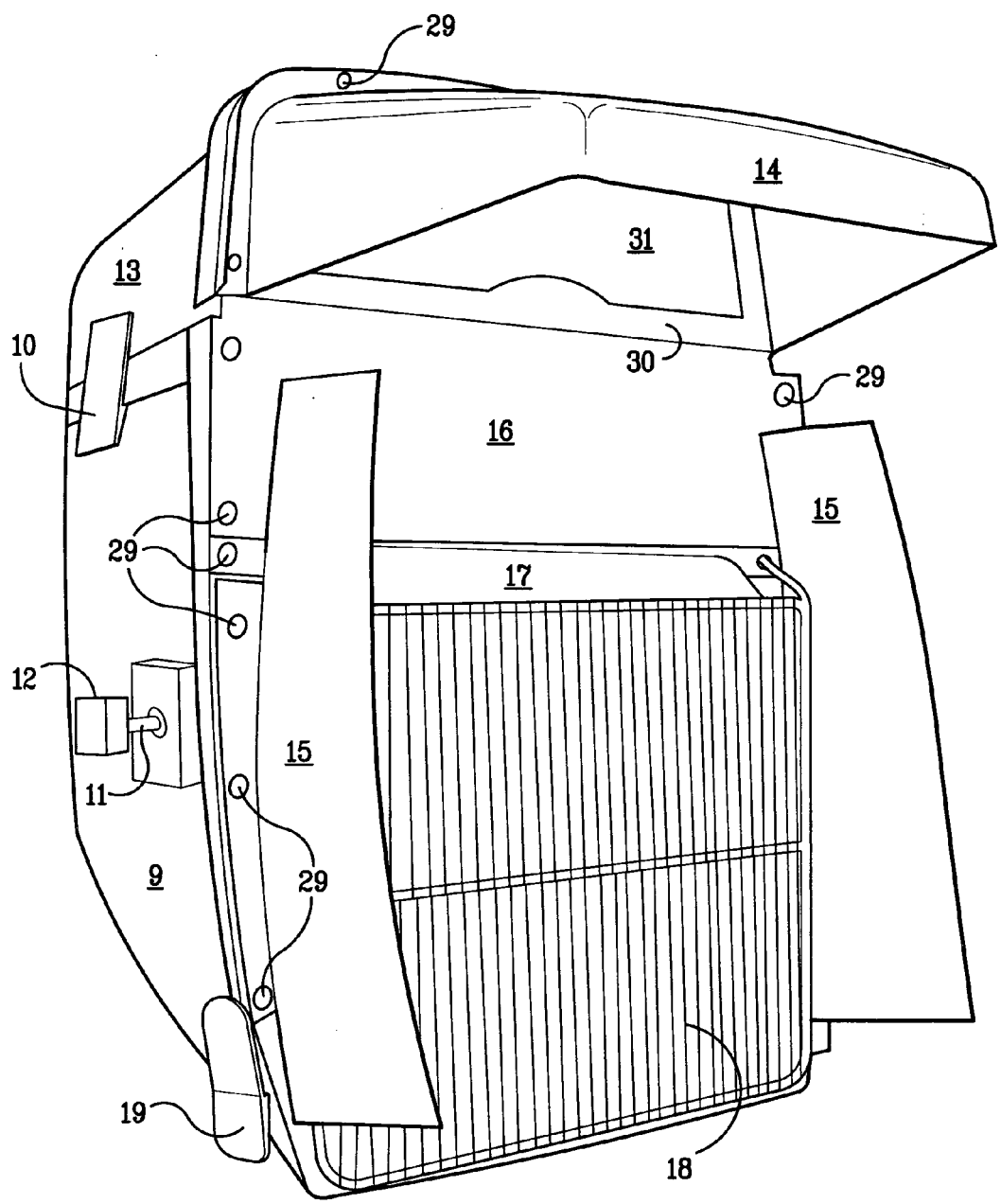
FIG. 8 shows a perspective view of a processor module of a system of the invention.

A perspective view of a processor module (9) of a system of the invention is shown in FIG. 8. The processor module (9) further comprises a litter screen (18), optional side shields (15), a waste containment compartment front (16), an optional litter retention shield (17), a processor cap optionally comprising a processor cap rear portion (13) which covers the waste containment compartment and a processor cap front portion (14) which forms a waste guide, axle(s) (11), axle ends (12), processor cap fasteners (10), processor fasteners (19), and optional processor cap door (31) and processor cap door frame (30). Fasteners (29) or fastening means (29) may be used to attach components of the processor together. Fasteners (29) may be located at convenient locations on the system. The fastener locations in the figures are for illustrative purposes only and are not meant to indicate exact locations and numbers of fasteners. Fasteners (29) and fastening means (29) may comprise screw fastening, nut and bolt fasteners, snap fasteners, friction fasteners, glue fastening, melted fastening, hook and loop fastening (VELCRO®), cotter pin fasteners, staple fasteners, or other fasteners.

One method of attaching a processor module (9) to a pan module (5) of the invention is shown in FIGS. 9A-E. In FIG. 9A, a rear view of the processor module (9) above the pan module (5) is shown. A side view of the processor module (9) above the pan module (5) is shown in FIG. 9C. As the processor module (9) is lowered into the rear of the pan module (5), the processor fasteners (19) engage pan portion (26) of the processor fasteners and snap into place. A rear view of the processor module (9) attached to the pan module (5) is shown in FIG. 9B. A side view of the processor module (9) attached to the pan module (5) is shown in FIG. 9D. As shown in FIG. 9E the processor module (9) rests inside the pan module (5), resting against pan module ridge (28) forming a seal. Other methods of attaching the pan module (5) to the processor module (9) may also be used, for example nut and bolt fasteners, snap fasteners in other locations, screw fasteners, rivet fasteners, glue fastening, hook and loop fasteners (VELCRO®), or other fastening means. In addition, the processor module and pan module may comprise a single contiguous unit.

Details of a litter screen and its attachment to a processor module are shown in FIGS. 10A-F. A view of the top edge of a litter screen (18) is shown in FIG. 10A. Litter screen attachment hooks (32) are used to attach a litter screen (18) to the processor module (9). A front view of the top of a litter screen (18) is shown in FIG. 10B and a side view of an attachment hook (32) is shown in FIG. 10C. The litter screen (18) may be formed of metal, plastic, wood, or other suitable material. The litter screen (18) may comprise parallel rods or wires, as shown in FIGS. 10A-F, or the litter screen may comprise a mesh (not shown) with rectangular holes of a size sufficient to allow litter to pass through the mesh. A gap between screening rods of between about 0.1 inches and about 0.4 inches, preferably about 0.25 inches, may be used.

A front view of a processor module, without a litter screen in place, is shown in FIG. 10D. Shown in FIG. 10D are a pan module (5), optional side shields (15), screened litter retention area (34), optional litter retention shield (17), and waste containment compartment front (16). As shown in FIG. 10E attachment hooks (32) of a litter screen (18) are placed in litter screen attachment holes (33). Litter screen attachment holes (33) are located in a front lip of a waste containment compartment floor (35). An optional litter retention shield (17) may be attached to the waste containment compartment floor (35) and project forward to about the top edge of the litter screen (18) as shown in FIG. 10F, a front view of a processor module (9) with a litter screen (18) in place. The optional litter retention shield may be contiguous with the waste containment compartment bottom. Also illustrated in FIG. 10F are optional side shields (15), and pan module (5).

A side exploded view of a processor cap of a system of the invention is shown in FIG. 11A. A processor cap optionally comprises a processor cap rear portion (13) and a processor cap front portion (14). Alternatively the processor cap front portion (14) and processor cap rear portion (13) may form a single contiguous unit. A processor cap may optionally comprise a processor cap door frame (30), and a processor cap door (31). Upon completion of a litter cleaning cycle the processor cap door closes, trapping odors within the waste containment compartment.

A perspective exploded view of a processor module (9) is shown in FIG. 11B. As shown in FIG. 11B waste containment compartment floor (35) slides into waste containment compartment back attachment slot (36). Although it is not shown in FIGS. 11B and 11D, waste compartment bottom may extend forward to about the top edge of the liner screen forming an optional litter retention shield (Item 17 in FIG. 1 and other FIGS.). Alternatively a separate litter retention shield (17) may be attached to the waste containment compartment floor (35). Litter screen (18) attachment hooks (32) are placed into litter screen attachment hook holes located on the front flap of the waste containment compartment floor (35). Waste containment compartment front (16) is attached to the side edges of processor module (9) above waste containment compartment floor (35). Side shields (15) may be attached to processor module side edges. Extending perpendicularly outward from opposite exterior sides of the processor module is at least one axle (11), which rests upon the support (7). The elements comprising the waste containment compartment may form a contiguous unit with the body of the processor module (9). As shown in FIG. 11C the processor cap is attached to processor module (9) by processor cap fasteners (10).

A side exploded view of the processor module (9) is shown in FIG. 11D. Processor cap door frame (30) may be held between processor cap rear portion (13) and processor cap front portion (14) by fasteners (29). Alternatively the processor cap may comprise a single unit, optionally comprising the processor cap door. The waste containment compartment (51) is comprised of the waste containment compartment front (16), the waste containment compartment floor (35) and portions of the processor module sides and rear. The outside vertical edges of the waste containment compartment front (16) are fastened to the front vertical edge flaps of the processor module sides by fasteners (29). The rear edge of the waste containment compartment floor (35) is placed into waste containment compartment back attachment slot (36) and the front outside edges of the waste containment compartment bottom are fastened to the front vertical edge flaps of the processor module sides by fasteners (29). The waste containment compartment bottom may optionally comprise a litter retention shield extending forward to about the top edge of the litter screen. The optional side shields (15) may be attached to the vertical edge flaps of the processor module sides by fasteners (29). The processor cap is attached to the processor module (9) by the processor cap fasteners (10) and the processor module (9) is attached to the pan module (5) by the processor fasteners (19).

Figure 11H:
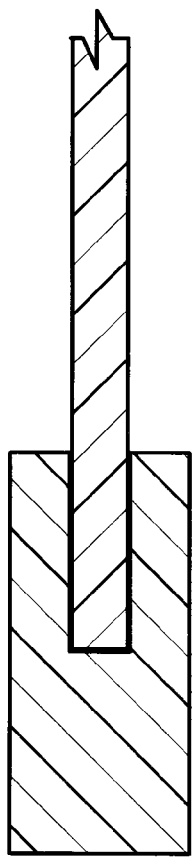

A view of the underside of the processor cap rear portion is shown in FIG. 11E. A view of the top of the processor module (9) is shown in FIG. 11F. Complementary projections and slots 11g and 11f are located at the edges of the processor cap rear portion (13) and processor module (9). When the processor cap is fastened to the processor module the projections fit into the slots as shown in FIGS. 11G and 11H forming a tongue and groove connection.

Figure 12A:
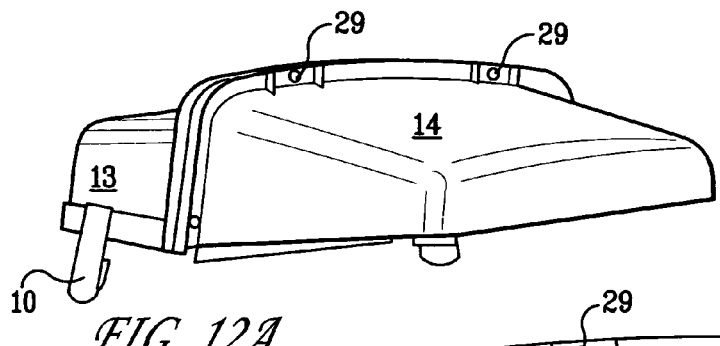
FIGS. 12A-E show details of a processor cap and processor cap door.
Figure 12B:
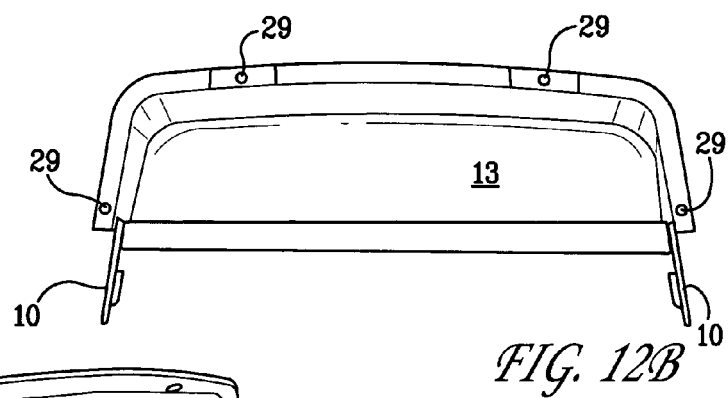
Figure 12C:
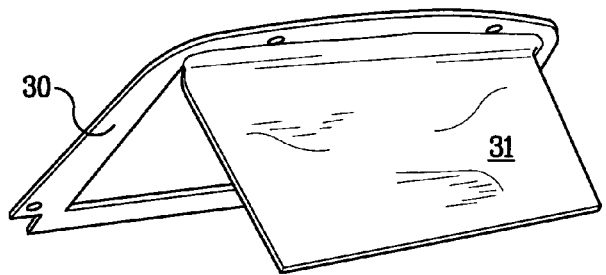
Figure 12D:
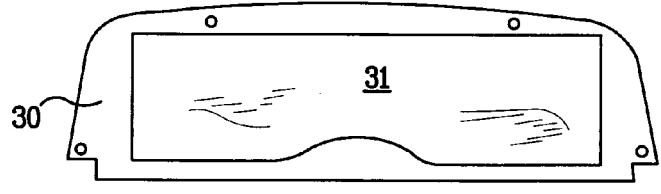
Figure 12E:
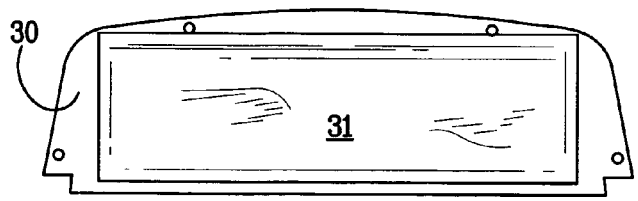

A perspective view of a processor cap is shown in FIG. 12A and a rear view of a processor cap is shown in FIG. 12B. A processor cap door (31) is attached to a processor cap door frame (30) as shown in FIGS. 12C-E. Fastening means positions (29) are also indicated in the figures. A greater or lesser number of fastening means may be employed to fasten the components of a system, such as a processor cap assembly, together. FIG. 12C is a rear perspective view of a processor cap door in the open position. A front view of a processor cap door is shown in FIG. 12D and a rear view of a processor cap door is shown in FIG. 12E.

Figure 13:
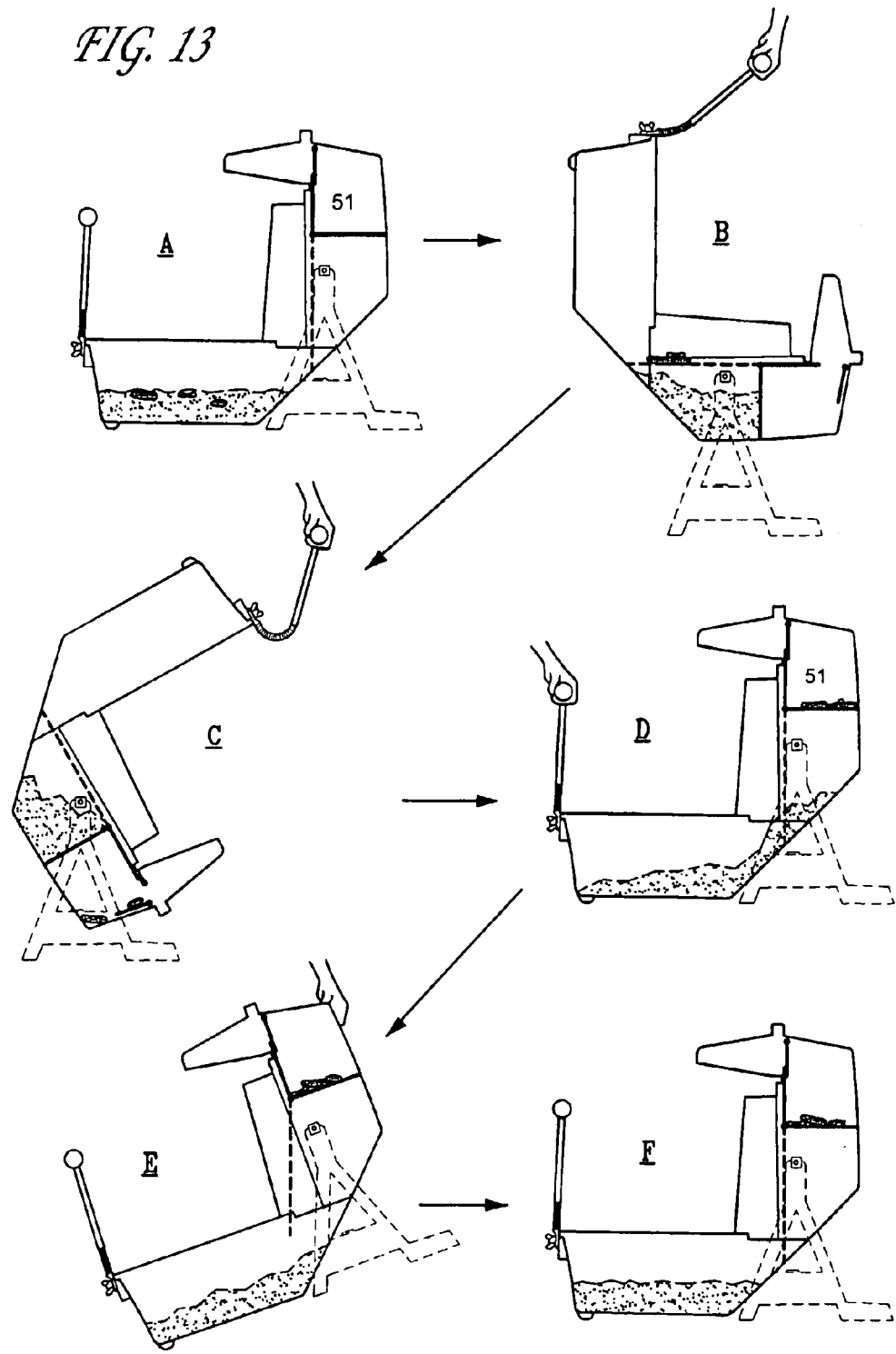
FIGS. 13A-F illustrate the steps of operating a system of the invention.

A system of the invention may be operated as shown in FIG. 13. The waste containment compartment (51) may be lined with a disposable plastic bag to facilitate the disposal of pet waste after the operation of the system. A user places litter into the pan module of the system. After the system has been used by a domestic pet, soiled litter and pet waste are contained within the pan module as shown in A. A user rotates the system approximately 90 degrees (B). The optional stick (1) may be used to assist the rotation of the system. As the system is rotated, litter flows through litter screen (18); pet waste and litter clumps remain on the litter screen and screened litter passes into the litter retention area of the processor module as shown in B. Gravity causes the processor cap door to open as shown in B. A user further rotates the system to approximately 150 degrees causing pet waste and clumped litter to pass into the processor cap, through the processor cap door, and into the waste containment compartment (51) as shown in C. After capturing the pet waste and litter clumps in the waste containment compartment (51), the system is rotated back to the resting position D. The processor cap door closes, trapping odors within the waste containment compartment (51), and litter flows back through the litter screen (18) into the pan module (5) as shown in D. The system is now ready for use. A user may optionally grasp a handle at the back of the processor module and lift the system to allow any liner remaining in the processor module (9) to flow into the pan module (5) and level the litter in the pan module as shown in E. The litter screen may rotate forward facilitating the flow of litter back into the pan module as shown in E. The system is then returned to the resting position as shown in F. When sufficient pet waste has been collected the processor cap may be removed, the disposable bag removed and replaced, and the processor cap replaced. The user may choose to dispose of pet waste after each cycle, or the user may choose to collect pet waste from multiple cleaning cycles before disposing of the accumulated waste.

A front view of a motorized system of the invention is shown in FIG. 14A. Motor (38) is operably connected to axle (11) via axle end (12). Axle (11) may comprise a single contiguous axle fixedly attached to both sides and projecting perpendicularly outward one to six inches or it may comprise an axle shaft (37) connected to a pair of exterior axles (11) fixedly attached to the sides of the processor module. Axle shaft (37) may be connected to axles (11) by a tongue and groove fastening as shown in FIGS. 14B-C, or the axle shaft may be connected to the axles by other fastening means such as nut and bolt fasteners, cotter pin fasteners, friction pin fasteners, friction fasteners, or other fasteners.

In an alternative embodiment, motor (38) is operably attached to a side of a processor module. The motor then may be used to rotate the system about an axle (11) that is not attached to the sides of the processor module. The axle (11) passes through the processor sides, and extends perpendicularly outward, but it is not attached to the sides, instead the processor unit may rotate about the axle (11).

Figure 14F:
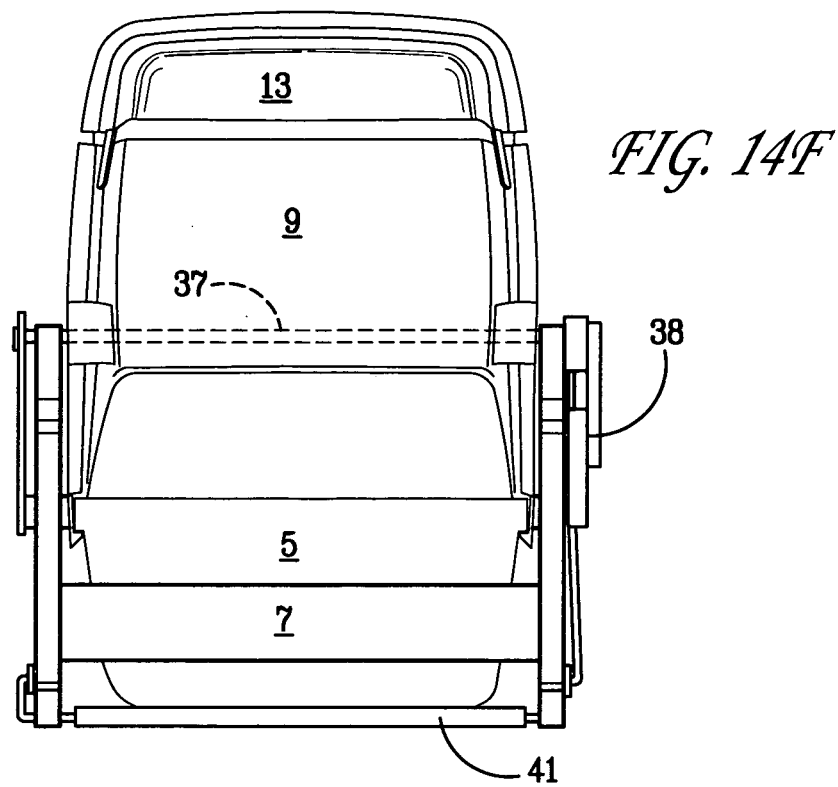
FIG. 14F shows a back view of a motorized system of the invention.
Figure 14G:
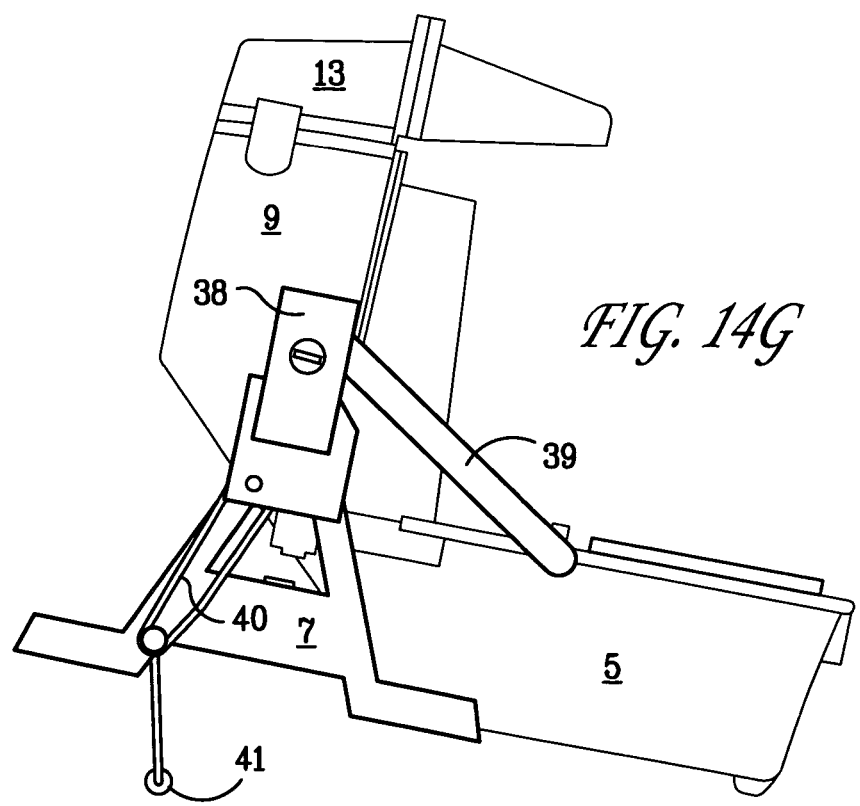
FIG. 14G shows a left side view of a motorized system of the invention in the lifted position.

Side views of a motorized system of the invention are shown in FIGS. 14D and 14E. The motor is controlled by a motor control module (not shown in the figures) operably connected to the motor as well as to pet detection means. Pet detection means include sensors, such as capacitance sensors, photodiode sensors, weight sensors, sound sensors, motion sensors, and other sensors. In addition, the motor control module comprises a switch which a user can activate to operate the motor. The motor (38) is operably connected to the lifting arms (39) via the axle (11). The lifting arms (39) are attached to the axle (11) via the axle ends (12). The lifting arms (39) are attached to the sides of the pan module (5) via the pan engaging portion (FIG. 16, 46) of the lifting arms. When the motor (38) is engaged the axle (11) rotates and with the aid of the lifting arms (39) the system is rotated and litter is processed. During the optional litter leveling portion of the litter processing cycle, system lifting bar (41) is actuated via belt (40), or other actuating means to raise the pan rear for the completion of litter removal from the processor and for litter leveling. A rear view of a motorized system of the invention is shown in FIG. 14F. The dashed line shown in FIG. 14F indicates the position of the axle shaft (37). The system lifting bar (41) is shown in the raised position assumed during the litter leveling portion of the litter processing cycle in FIG. 14G.

Figures 15A, 15B, 15C:
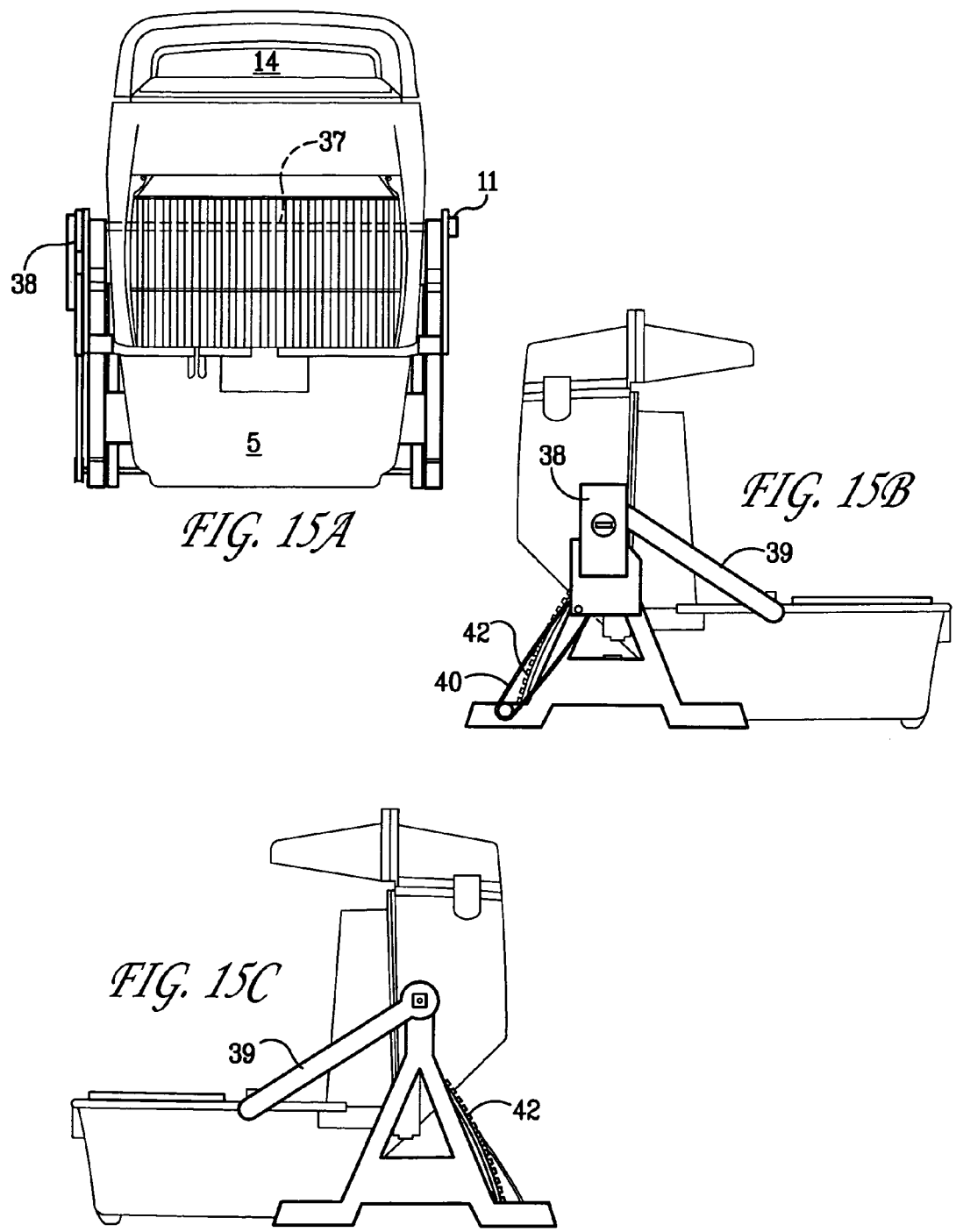
FIG. 15A shows a front view of a motorized system of the invention.
FIG. 15B shows a left side view of a motorized system of the invention.
FIG. 15C shows a right side view of a motorized system of the invention.
Figure 15D:
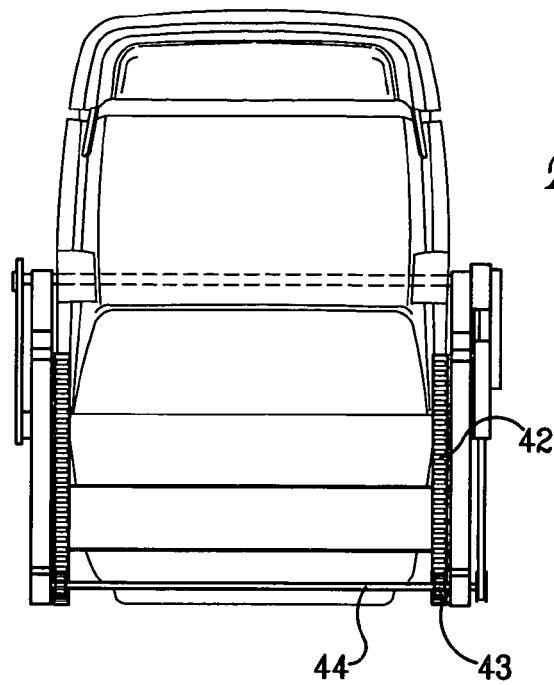
FIG. 15D shows a back view of a motorized system of the invention.
Figure 15E:
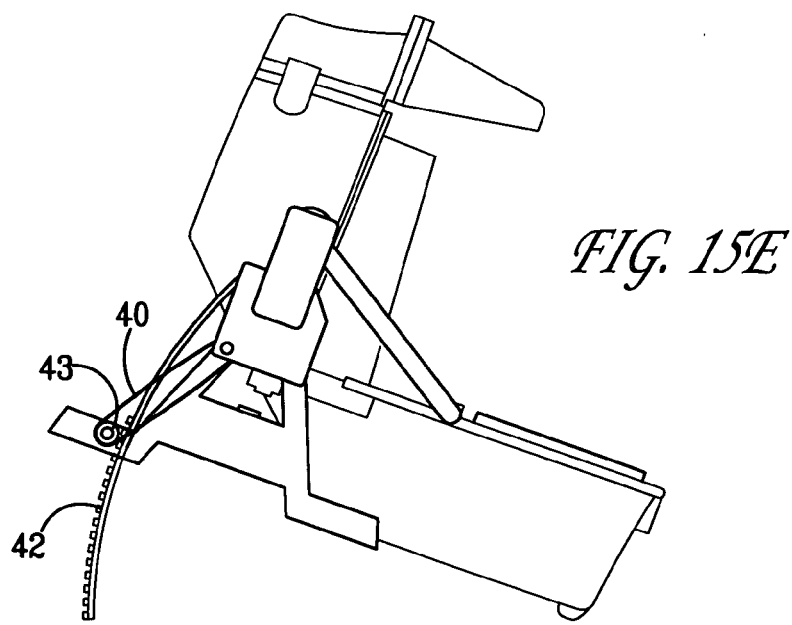
FIG. 15E shows a side view of a motorized system of the invention in the lifted position.

A front view of an alternative embodiment of a motorized system of the invention is shown in FIG. 15A. Motor (38) is operably connected to axle (11) and axle shaft (37) which passes through the screened litter retention area and connects to the axle (11) attached to the opposite side of the processor. Left and right side views of a motorized system of the invention is shown in FIGS. 15B and 15C, and a rear view is shown in FIG. 15D Motor (38) is operably connected to the axle (11) as well as belt (40) which is operably connected to the toothed gears (43). The toothed gears are connected to one another via the shaft (44). In an alternative embodiment, motor (38) is operably attached to a side of a processor module. The motor then may be used to rotate the system about an axle(s) that is not fixedly attached to the sides of the processor module, allowing the processor unit to rotate about the axle. The motor is controlled by a motor control module (not shown in the figures) operably connected to the motor as well as to pet detection means. Pet detection means include sensors, such as capacitance sensors, photodiode sensors, weight sensors, sound sensors, motion sensors, and other sensors. In addition, the motor control module comprises a switch which a user can activate to operate the motor. During the leveling portion of the litter processing cycle, the toothed system lifting bars (42) are engaged via motor (38), belt (40), and toothed gears (43) raising the rear portion of the pan. A view of the system in the raised position is shown in FIG. 15E.

A perspective view of a pan lifting bar (39) of an embodiment of the invention is shown in FIG. 16A. The pan lifting bar comprises an axle engaging portion (44), a shaft portion (45), and a pan engaging portion (46). The axle engaging portion (44) of the pan lifting bars engages the polygonal axle ends (12) which comprise the outer portion of the axles (11). The axle engaging portion (44) may therefore comprise a slot, a triangular hole, a square hole, a pentagonal hole, a hexagonal hole or other polygonal hole so as to correspond with the axle ends (12). In addition the axle engaging portion (44) may comprise a toothed shape to correspond to a toothed axle end (12). The pan lifting bars (39) may be held in place by cotter pins or glue or other fastening means to insure that the pan lifting bars (39) do not disengage from the axles (11). Pan engaging portion (46) is designed to connect to a top edge of a pan module. The pan engaging portion (46) may be fastened to the pan by friction, or by other fastening means such as nut and bolt fasteners, cotter pin fasteners, hook and loop fasteners (VELCRO®), or other fasteners. An outside view is shown in FIG. 16B, and an inside view is shown in FIG. 16C.

Figure 17:
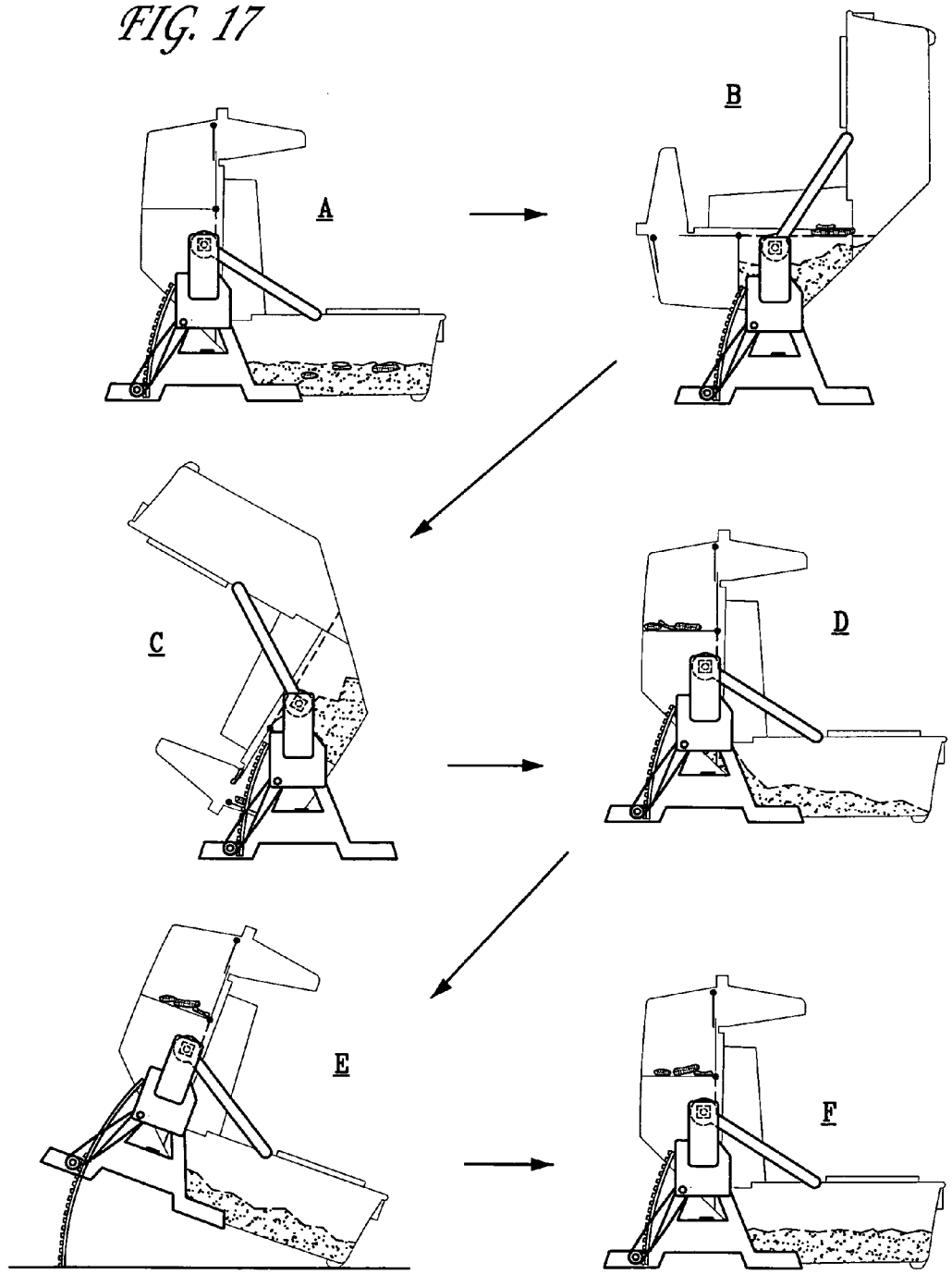
FIGS. 17A-F illustrate the steps of the operation of a motorized system of the invention.

The sequences of steps performed by motorized systems of the invention are shown in FIGS. 17A-F. A system in the resting position is shown in FIG. 17A. A user may line the waste containment area with a disposable plastic bag for convenient disposal of soiled litter and pet waste. A user places litter into the pan module of the system. After the system has been used by a domestic pet, soiled litter and pet waste are contained within the pan. A detecting means connected to a motor control module of the system may be used to detect the presence of a pet using the litter box. The detecting means may comprise motion sensors, photoelectric or photodiode sensors, capacitance sensors, weight sensors, motion sensors or other means of detecting a pet. Operation of the system is managed by a motor control module operably connected to the motor or motors of the system; operably connected to the detecting means; operably connected to a power source such as a battery or electric power from a power outlet; and further comprising a switch for user initiation of the litter cleaning cycle. After a pet has exited the litter box the system waits for approximately zero to five minutes and then the litter processing cycle may be automatically begun. Alternatively a user may push a button to initiate the litter cleaning cycle. At the end of the waiting period the motor starts and rotates the system to process the litter. The system is rotated at a speed between approximately 1 rpm to approximately 5 rpm. FIG. 17B shows the system rotated approximately 90 degrees with litter flowing through the litter screen into the screened litter retention area. Clumped litter and pet waste remain on top of the litter screen. As the system continues to rotate to approximately 150 degrees (17C), clumped litter and pet waste flow into the processor cap, through the processor cap door, and into the waste containment compartment. The motor then reverses direction and the system rotates back to the resting position shown in FIG. 17D. The motor may then optionally engage the system lifting means, for example the system lifting bar or the toothed system lifting bar and the rear portion of the system is lifted, allowing any litter remaining in the screened litter retention area to flow back into the pan and leveling the litter in the pan. The motor then reverses direction, retracts the system lifting bar(s), and brings the system back to the normal resting position. When sufficient pet waste has been collected the processor cap may be removed, the disposable bag removed and replaced, and the processor cap replaced.

Figure 18A:
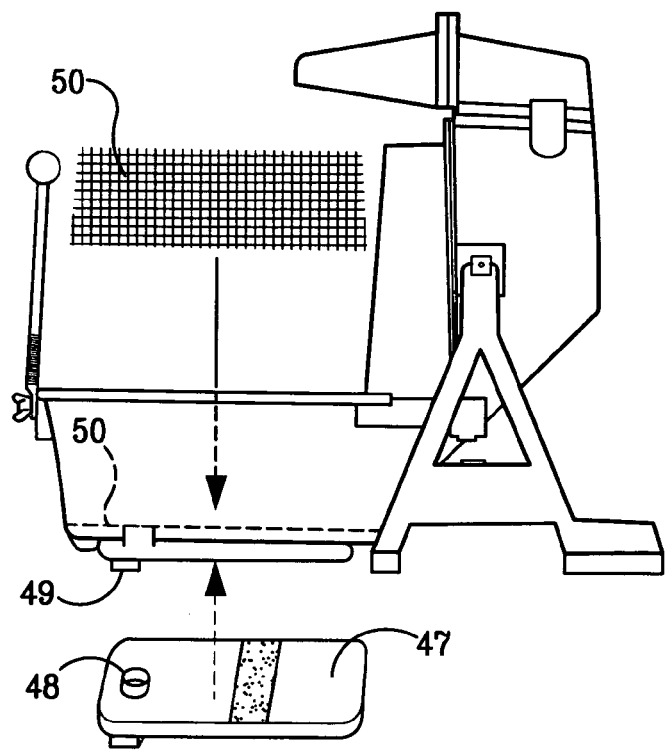
FIG. 18A shows a side view of a system of the invention with optional urine collection vessel and litter impervious screen.
Figure 18B:
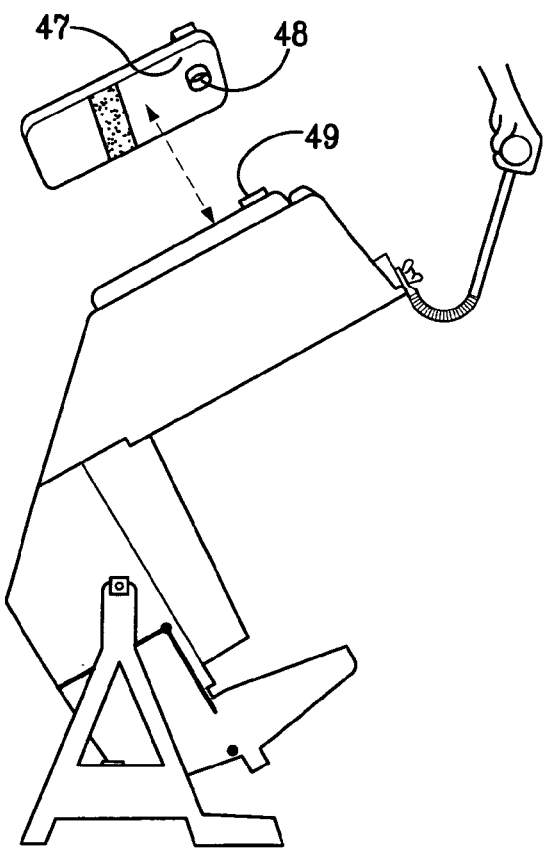
FIG. 18B shows a side view of a system of the invention with optional urine collection vessel.

Embodiments of the invention may optionally comprise a urine collection vessel (47), a litter impervious screen, and an outlet in the bottom of the pan module as shown in FIGS. 18A-B. The urine collection vessel comprises an inlet portion (48) which is removably attached to the outlet portion (49) of the pan module. The inlet portion (48) of the urine collection vessel (47) may be attached to the outlet portion (49) of the pan module (5) via a friction connection, a screw connection, or connection through which liquid cannot escape. Preferably the inlet portion (48) has a larger diameter than the outlet portion (49). The urine collection vessel (47) may be held in place with a fastener such as a hook and loop fastener (VELCRO®), or other fastener or strap to insure that the vessel remains attached to the pan module (5) during system use. A litter impervious screen (50) is placed in the bottom of the pan to prevent litter from flowing through the outlet portion (49) of the pan. Typically nonabsorbent litter is then placed in the pan. When a pet urinates in the litter box, the litter flows past the nonabsorbent litter to the bottom of the pan and then to the outlet portion (49) of the pan and into the urine collection vessel (47). The urine collection vessel (47) may be retrieved by rotating the system approximately 150 degrees, allowing access to the underside of the pan, and then disengaging the urine collection vessel (47) from the pan.

I claim:

1. A pet litter containment and cleaning system comprising:
   a pan module adapted to hold pet litter comprising a front portion, a rear portion, sides, and a bottom;
   the pan rear portion forming an angle between about 20 degrees and about 70 degrees with a plane containing the pan bottom;
   a processor module comprising:
      a bottom portion attached to the rear portion of the pan module;
      a top portion comprising a waste containment compartment comprising a floor;
      a litter screen attached to the waste containment compartment floor;
      a litter retention shield attached to the waste containment compartment floor,
      extending to about a top edge of the litter screen;
      processor module sides comprising an interior, an exterior, and a front;
      at least one axle projecting perpendicularly outward from the side exteriors about one to six inches;
      the at least one axle defining an axis of rotation for the system;
      side shields fastened to front sides of the processor module and aligned approximately parallel with the sides;
   a processor cap, comprising a front portion and a rear portion, removably attached to the top portion of the processor module;
   the processor cap rear portion covering the waste containment compartment;
   the processor cap front portion projecting past the front of the processor module to form a waste guide;
   the processor cap further comprising a processor cap door;
   a support comprising axle bearing areas upon which the at least one axle rests;
   a motor, a motor control system, lifting arms, and at least one system lifting bar wherein:
      the motor control system is operably attached to the motor;
      the motor is operably attached to the at least one axle;
      each lifting arm comprising an axle engaging portion at one end, a pan engaging portion at another end, and a shaft portion therebetween;
      the pan engaging portion of a lifting arm is attached to a side of a pan module and the axle engaging portion of a lifting arm is attached to the at least one axle;
      the motor operably attached to the at least one system lifting bar whereby the motor engages the at least one system lifting bar to lift the rear portion of the pan module thereby leveling litter within the pan module.

2. The system of claim 1 wherein the at least one axle is: fixedly attached to opposite exterior sides of the processor module.

3. The system of claim 2 wherein the at least one axle is two axles which are:
   fixedly attached to opposite exterior sides of the processor module;
   aligned collinearly defining an axis of rotation.

4. The system of claim 1 wherein the at least one axle:
   passes through the processor sides;
   is not fixedly attached to the processor sides.

5. The system of claim 1 further comprising:
a litter impervious screen in the bottom of the pan module;
an outlet in the bottom of the pan module;
a urine collection vessel further comprising an inlet wherein the inlet is removably attached to the outlet of the pan module.

6. A pet litter containment and cleaning system comprising:
a pan module adapted to hold pet litter comprising a front portion, a rear portion, sides, and a bottom;
the pan rear portion forming an angle between about 20 degrees and about 70 degrees with a plane containing the pan bottom;
a processor module comprising:
a bottom portion attached to the rear portion of the pan module;
a top portion comprising a waste containment compartment further comprising a floor;
a litter screen attached to the waste containment compartment floor;
processor module sides comprising an interior and an exterior and a front;
at least one axle projecting perpendicularly outward from the side exteriors about one to six inches;
the at least one axle defining an axis of rotation for the system;
a processor cap, comprising a front portion, a processor cap door frame, a processor cap door, and a rear portion;
the processor cap rear portion removably attached to the top portion of the processor module;
a processor cap rear portion covering the waste containment compartment;
a processor cap door frame disposed between a processor cap rear portion and a processor cap front portion;
a processor cap door frame removably attached to a processor cap rear portion and a processor cap front portion;
a processor cap door directly attached to a processor cap door frame;
the processor cap front portion projecting past the front of the processor module to form a waste guide;
a support comprising axle bearing areas upon which the at least one axle rests.

7. The system of claim 6 wherein the at least one axle is:
fixedly attached to opposite exterior sides of the processor module.

8. The system of claim 7 wherein the at least one axle is two axles which are:
fixedly attached to opposite exterior sides of the processor module;
aligned collinearly defining an axis of rotation.

9. The system of claim 8 wherein the at least one axle:
passes through the processor sides;
is not fixedly attached to the processor sides.

10. The system of claim 6 further comprising side shields fastened to the front sides of the processor module and aligned approximately parallel with the processor module sides.

11. The system of claim 6 wherein the processor module further comprises a litter retention shield attached to the bottom of the waste containment compartment floor and extending to about the top edge of the litter screen.

12. The system of claim 6 further comprising a stick directly connected to a stick handle spring;
the stick handle spring directly connected to an attachment point;
and an attachment point directly connected to the pan module front portion.

13. The system of claim 6 further comprising:
a litter impervious screen in the bottom of the pan module;
an outlet in the bottom of the pan module;
a urine collection vessel further comprising an inlet wherein the inlet is removably attached to the outlet of the pan module.

14. A method of cleaning and recycling pet litter comprising:
providing a pet litter containment and cleaning system, the system comprising:
a pan module adapted to hold pet litter comprising a front portion, a rear portion, sides, and a bottom;
the pan rear portion forming an angle between about 20 degrees and about 70 degrees with a plane containing the pan bottom;
a processor module comprising:
a bottom portion attached to the rear portion of the pan module;
a top portion comprising a waste containment compartment further comprising a floor;
a litter screen attached to the waste containment compartment floor;
processor module sides comprising an interior and an exterior and a front;
at least one axle projecting perpendicularly outward from the side exteriors about one to six inches;
the at least one axle defining an axis of rotation for the system;
a processor cap, comprising a front portion, a processor cap door frame, a processor cap door, and a rear portion;
the processor cap rear portion removably attached to the top portion of the processor module;
the processor cap rear portion covering the waste containment compartment;
a processor cap door frame disposed between a processor cap rear portion and a processor cap front portion;
a processor cap door frame removably attached to a processor cap rear portion and a processor cap front portion;
a processor cap door directly attached to a processor cap door frame;
the processor cap front portion projecting past the front of the processor module to form a waste guide;
a support comprising axle bearing areas upon which the at least one axle rests;
placing litter into the pan module of the system;
allowing a pet to use the litter contained within the system;
rotating the system about an axis of rotation;
allowing litter to flow through the litter screen into the processor module;
allowing the pet waste to flow into the processor cap;
returning the system to the original position;
allowing cleaned litter to flow into the pan module;
and allowing pet waste to flow into the waste containment area.

15. The method of claim 14 further comprising the step of lifting the rear of the system and allowing any litter remaining in the processor module to flow into the pan module.

16. The method of claim 14 wherein the system is rotated by a motor.

* * * * *